(12) United States Patent
Lelescu et al.

(10) Patent No.: US 7,924,918 B2
(45) Date of Patent: Apr. 12, 2011

(54) TEMPORAL PREDICTION IN VIDEO CODING

(75) Inventors: Dan Lelescu, Morgan Hill, CA (US); Frank Bossen, Plan-les Ouates (CH)

(73) Assignee: NTT Docomo, Inc., Tokyo (JP)

( * ) Notice: Subject to any disclaimer, the term of this patent is extended or adjusted under 35 U.S.C. 154(b) by 1435 days.

(21) Appl. No.: 11/288,822

(22) Filed: Nov. 28, 2005

(65) Prior Publication Data

US 2006/0114997 A1 Jun. 1, 2006

Related U.S. Application Data

(60) Provisional application No. 60/631,826, filed on Nov. 29, 2004.

(51) Int. Cl.
*H04N 11/02* (2006.01)
*H04N 11/04* (2006.01)

(52) U.S. Cl. ......... 375/240.12; 375/240.24; 375/240.16; 375/240.25

(58) Field of Classification Search ............. 375/240.16, 375/240.24, 240.12, 240.13, 240.14, 240.15, 375/240.17, 240.27, 240.01, 240.02, 240.25; 382/236, 239, 274

See application file for complete search history.

(56) References Cited

U.S. PATENT DOCUMENTS

| | | | |
|---|---|---|---|
| 5,544,239 | A | 8/1996 | Golin et al. |
| 6,456,658 | B2 | 9/2002 | Kamikura et al. |
| 2004/0008786 | A1 | 1/2004 | Boyce |

OTHER PUBLICATIONS

PCT Written Opinion for PCT/US2005/043110, mailed on Jun. 7, 2007 (6 pages).

Rodrigues, N. M. M., et al., "Hierarchical Motion Compensation with Spatial and Luminance Transformations", 2001.
Kamikura, K., et al., "Global Brightness-Variation Compensation for Video Coding", IEEE Transactions on Circuits and Systems for Video Technology, vol. 8, No. 8, Dec. 1998.
Kim, .S H., et al., "Fast Local Motion Compensation Algorithm for Video Sequences with Brightness Variations", IEEE Transactions on Circuits and Systems for Video Technology, vol. 13, No. 4, Apr. 2003.
International Search Report mailed Apr. 21, 2006. 5 pages.
Written Opinion of the International Searching Authority. 4 pages.
Paul, Baldine-Brunnel, "Fractal-based compression of motion video sequences". Proceedings of the International Conference on Image Processing. Nov. 1994.
Calzone S. et al, "Video compression by mean-corrected motion compensation of partial quadtrees". IEEE Transactions of circuits and systems for video technology. Feb. 1997.
Freina T, et al, "Predicitive fractal image coding: hybrid algorithms and compression of residuals". Data compression conference. Mar. 1998.
Reusens E. "Sequence coding based on the fractal theory of the iterated transformations systems". Proceedings of the SPIE. 1993.
Barthel K.U., et al, "Three-dimensional fractal video coding". Proceedings of the International conference on image processing. Oct. 1995.
Dong X. et al. "Hybrid video sequence coder using fractals". International conference on consumer electronics. Jun. 1995.
Written Opinion of the International Searching Authority mailed Apr. 21, 2006, 4 pages.
Japanese Office Action for corresponding Japanese Patent Application No. 2007-543589, Dec. 21 , 2010, 3 pgs.

*Primary Examiner* — Dov Popovici
(74) *Attorney, Agent, or Firm* — Blakely, Sokoloff, Taylor & Zafman LLP

(57) ABSTRACT

A method, apparatus and article of manufacture for performing temporal prediction are described. In one embodiment, a decoding method includes, but is not limited to, generating a prediction for a sample in one of multiple blocks using transformation parameters associated with the one block and transformation parameters associated with at least one other block in the group of blocks and adding residual data to the prediction to obtain a decoded sample.

37 Claims, 16 Drawing Sheets

Generate a motion-compensated prediction for the data based on motion information and non-motion related transformation model information
101

Generate a prediction error based on the motion-compensation prediction
102

Codes the prediction error
103

FIG. 1A

TEMPORAL PREDICTION IN VIDEO CODING

PRIORITY

The present patent application claims priority to the corresponding provisional patent application Ser. No. 60/631,826, entitled, "Method and Apparatus for Temporal Prediction in Video Coding," filed on Nov. 29, 2004.

BACKGROUND OF THE INVENTION

Temporal prediction is a commonly-used technique for the efficient coding of video information. Rather than code and transmit the actual luminance or chrominance values of an image in a video sequence, a prediction for this image is formed by using previously coded, reconstructed, and stored image data as reference, followed by coding the differences between the image being coded and its prediction. The better the prediction formation process is, the more efficient the video coding becomes, since the prediction error that is coded is decreased. Thus, conventional predictive video coding include a process of predicting data in a frame of a video sequence by using information from already-coded and reconstructed frames from that sequence called reference frames. This process routinely operates at the block-level in the images. In predictive block coding, rather than code the data of the block itself, a corresponding prediction block is subtracted from the block being coded and the resulting prediction error is coded instead.

Temporal prediction is a process that consists of two main components, a motion estimation process and a motion compensation process. Given a current block being coded in a current image from a video sequence, motion estimation attempts to find the best matching block in one or more reference frames of that video sequence. The outcome of the motion estimation process consists of motion vectors indicating the displacements of blocks in the current frame with respect to their best corresponding block matches (predictors) in one or more reference frames.

It is possible that the motion estimation process may perform better if reference frame data consisting of luminance or chrominance information is transformed in some way prior to motion estimation, to make it more closely correlated with the current frame data. This transformation is reflective of a model that describes the differences between the current and a reference data block, and it can be seen as a way to compensate for those differences. The potential benefit of such a compensating transformation working in conjunction with the motion estimation process ultimately consists of an increase in coding efficiency due to better motion estimation and the formation of a better prediction for the current block by the motion compensation process.

A motion compensation process takes the motion vectors produced by the motion estimation process and compensates for motion existing between the current frame being coded and a reference frame. The outcome of this conventional motion compensation consists of one or more prediction blocks taken from one or more reference frames and corresponding to the current block being coded. To form a good prediction, the reference image data may be used as is, or it may be transformed according to a particular model prior to forming the prediction. Any transformation that may have been determined as suitable to be applied to a reference block in connection with the motion estimation process executed for the current block is applied to the corresponding motion compensated block prior to computing the prediction error. A frame-level transformation of reference image data for prediction is generally insufficient for determining a sufficiently improved prediction. Block-level transformations of reference data are capable of producing better block-wise predictions for blocks in the image being coded, at the cost of higher overhead.

Using this joint motion and transformation-compensated prediction process, a prediction for the current block is formed. A better block prediction results in a small prediction error that needs to be coded in the video coder, which results in coding gains. However, conventional methods using a joint transformation and motion compensation of data in reference frames to generate a prediction for the frame being coded are limited in the amount of rate-distortion coding gains they generate because of their insufficient use of the prediction data available in reference frames. Also, conventional methods may further accentuate the blocking artifacts associated with the use of independent block-level processing in conventional video coding.

The determination of parameters of compensating transformations that are applied to reference image data in order to improve the quality of the prediction signal in video coding has been presented in K. Kamikura, et all, "Brightness-Variation Compensation Method and Coding/Decoding Apparatus for Moving Pictures," NTT(JP), U.S. Pat. No. 6,456,658, issued September 2002; S. J. Golin, et al., "Methods and Apparatus for Improving Motion Analysis of Fades," Intel Corporation, U.S. Pat. No. 5,544,239, issued August 1996; J. M. Boyce, "Adaptive Weighting of Reference Pictures in Video Encoding," U.S. Patent Application Publication No. US2004/0008786, filed January 2004; N. M. M. Rodrigues, et al., "Hierarchical Motion Compensation with Spatial Luminance Transformations," 2001; K. Kamikura, et al., "Global Brightness-Variation Compensation for Video Coding," IEEE Transactions on Circuits and Systems for Video Technology, Vol. 8, No. 8, December 1998; and S. H. Kim, et al., "Fast Local Motion Compensation Algorithm for Video Sequences with Brightness Variations," IEEE Transactions on Circuits and Systems for Video Technology, Vol. 13, No. 4, April 2003. The transformation can be determined for, and applied to data in a reference frame at frame level in which case the motion estimation process operates with respect to the transformed reference frame. Alternatively, block-level transformations can be determined during the motion estimation process. These transformations are applied block-wise to form the prediction blocks used in the prediction error computation in conventional video coders. Based on the block-wise transformation parameters determined in a first stage, only a subset of parameters are actually retained for use for a given frame, for example, including the most often used block-level models in the frame. The transformation models that were used in related art include single-parameter (offsetting, or scaling) models, 2-parameter linear models (scaling and offsetting), and 6-parameter affine models. In another approach, a hierarchical compensation is applied by combing initial frame-level compensation with a subsequent block-level refinement of the transformation.

The determination of a single, or a small number of transformation models to be used for compensating a frame in predictive video encoding introduces a limitation in terms of the coding efficiency gain. This is caused by a limited capacity to describe the differences that exist between a current frame being encoded and a frame used for reference. The approaches that determine and use block-wise transformation models somewhat alleviate this limitation; however, they are still restricted in increasing the quality of the prediction and thus, the objective coding efficiency. Additionally, because they operate on individual blocks independently, these approaches preserve or even accentuate the blocking artifacts which are detrimental to the subjective quality of decoded images.

SUMMARY OF THE INVENTION

A method, apparatus and article of manufacture for performing temporal prediction are described. In one embodiment, a decoding method comprises generating a prediction for a sample in one of multiple blocks using transformation parameters associated with the one block and transformation parameters associated with at least one other block in the group of blocks and adding residual data to the prediction to obtain a decoded sample.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1A is a flow diagram of one embodiment of a an encoding process.

DETAILED DESCRIPTION OF THE PRESENT INVENTION

Figure 1B:
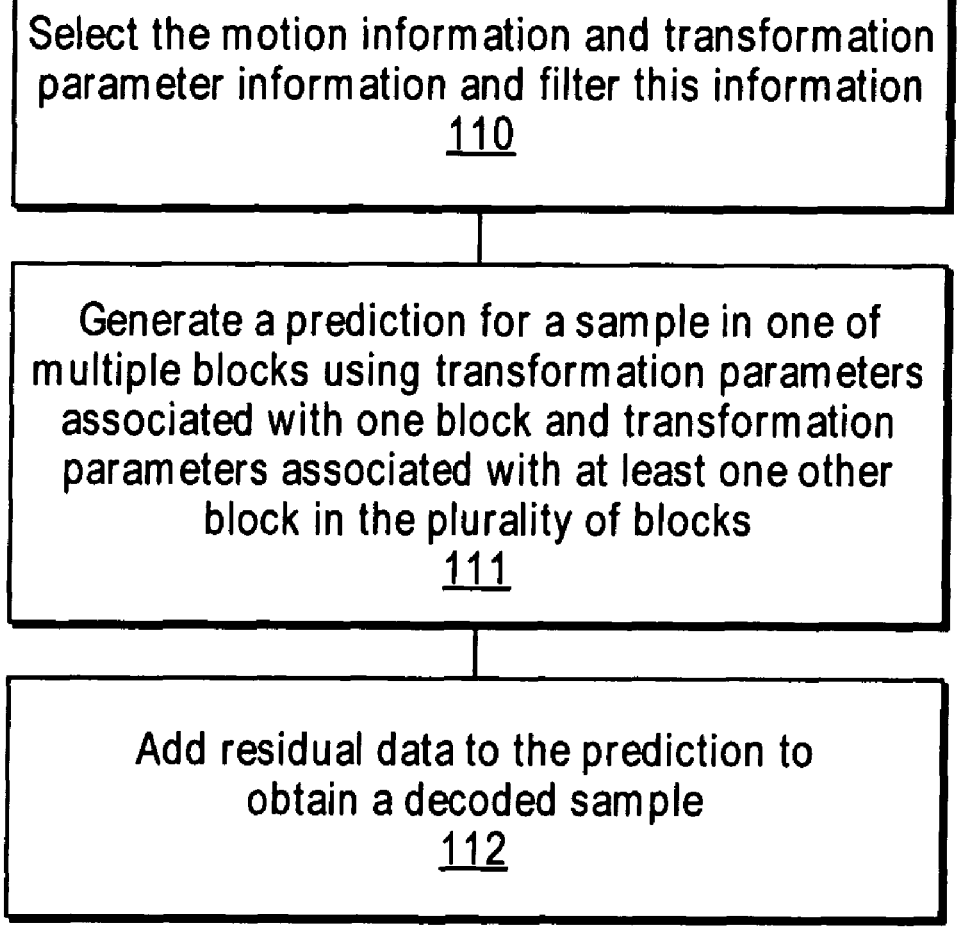
FIG. 1B is a flow diagram of one embodiment of an a decoding process.

Apparatuses and methods for a prediction filtering process in video coding. The prediction filtering is based on a combination of motion information and non-motion related transformation models corresponding to multiple image blocks to determine a prediction for the block being coded in a frame of a video sequence.

In one embodiment, block-level transformation models are determined during the motion estimation process. A conditional motion-compensated prediction determination and filtering is made for the purpose of forming a prediction for the predicted blocks of a frame being encoded. A conditional selection process determines the predictive data (e.g., predictive samples) and the initial block-level transformation parameter sets used by the filtering process. Then, a predictive filtering process uses the set of predictive samples and transformation parameters to form a filtered sample-wise prediction for a data sample. In one embodiment, the prediction filtering approach processes intensity-compensating parameters associated with blocks in a frame and temporal predictive sample candidates to generate a better prediction. Thus, the motion information and the transformation models linking blocks in the current frame to their corresponding reference blocks are combined to obtain the final prediction for the current block being predictively coded.

The processing described herein results in increased coding efficiency and in the reduction of blocking artifacts compared to related art video coding methods, where blocking artifacts result from the independent processing of individual blocks in an image. The design of the prediction determination and filtering process described herein is important for the rate-distortion performance of the video coding process, as well as for determining the degree to which the blocking artifacts can be reduced.

FIG. 1A is a flow diagram of one embodiment of a decoding process. The process is performed by processing logic that may comprise hardware (circuitry, dedicated logic, etc.), software (such as is run on a general purpose computer system or a dedicated machine), or a combination of both.

FIG. 1A is a flow diagram of one embodiment of a an encoding process. The process is performed by processing logic that may comprise hardware (circuitry, dedicated logic, etc.), software (such as is run on a general purpose computer system or a dedicated machine), or a combination of both.

In one embodiment, processing logic generates the motion-compensated prediction by filtering prediction samples and combining filtered prediction samples to form the motion-compensated prediction for a current block of the frame.

After generating the prediction, processing logic generates a prediction error based on the motion-compensated prediction (processing block 102). In one embodiment, the prediction error comprises a difference between the current block of the frame and the final prediction.

Once the prediction error has been generated, processing logic codes the prediction error (processing block 103).

FIG. 1B is a flow diagram of one embodiment of an encoding process. The process is performed by processing logic that may comprise hardware (circuitry, dedicated logic, etc.), software (such as is run on a general purpose computer system or a dedicated machine), or a combination of both.

FIG. 1B is a flow diagram of one embodiment of a decoding process. The process is performed by processing logic that may comprise hardware (circuitry, dedicated logic, etc.), software (such as is run on a general purpose computer system or a dedicated machine), or a combination of both.

In one embodiment, filtering the motion information and intensity compensation information comprises filtering predictive samples, where each of the predictive samples is compensated using block intensity compensation parameters. In another embodiment, filtering the motion information and intensity compensation information comprises filtering block intensity compensation parameters to obtain sample-level intensity compensation parameters. In yet another embodiment, filtering the motion information and intensity compensation information comprises filtering predictive samples, where each of the predictive samples is compensated using sample-level intensity compensation parameters.

After filtering, processing logic generates a prediction for a sample in one of multiple blocks using transformation parameters associated with the one block and transformation parameters associated with at least one other block in the plurality of blocks (processing block 111). In one embodiment, processing logic generates the prediction based on the selected motion and intensity compensation information.

After generating the prediction, processing logic adds residual data to the prediction to obtain a decoded sample (processing block 1112). In one embodiment, the prediction is generated based on the intensity compensation information and motion information.

These processes will be described in more detail below.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An Example of a Video Coder

Figure 2:
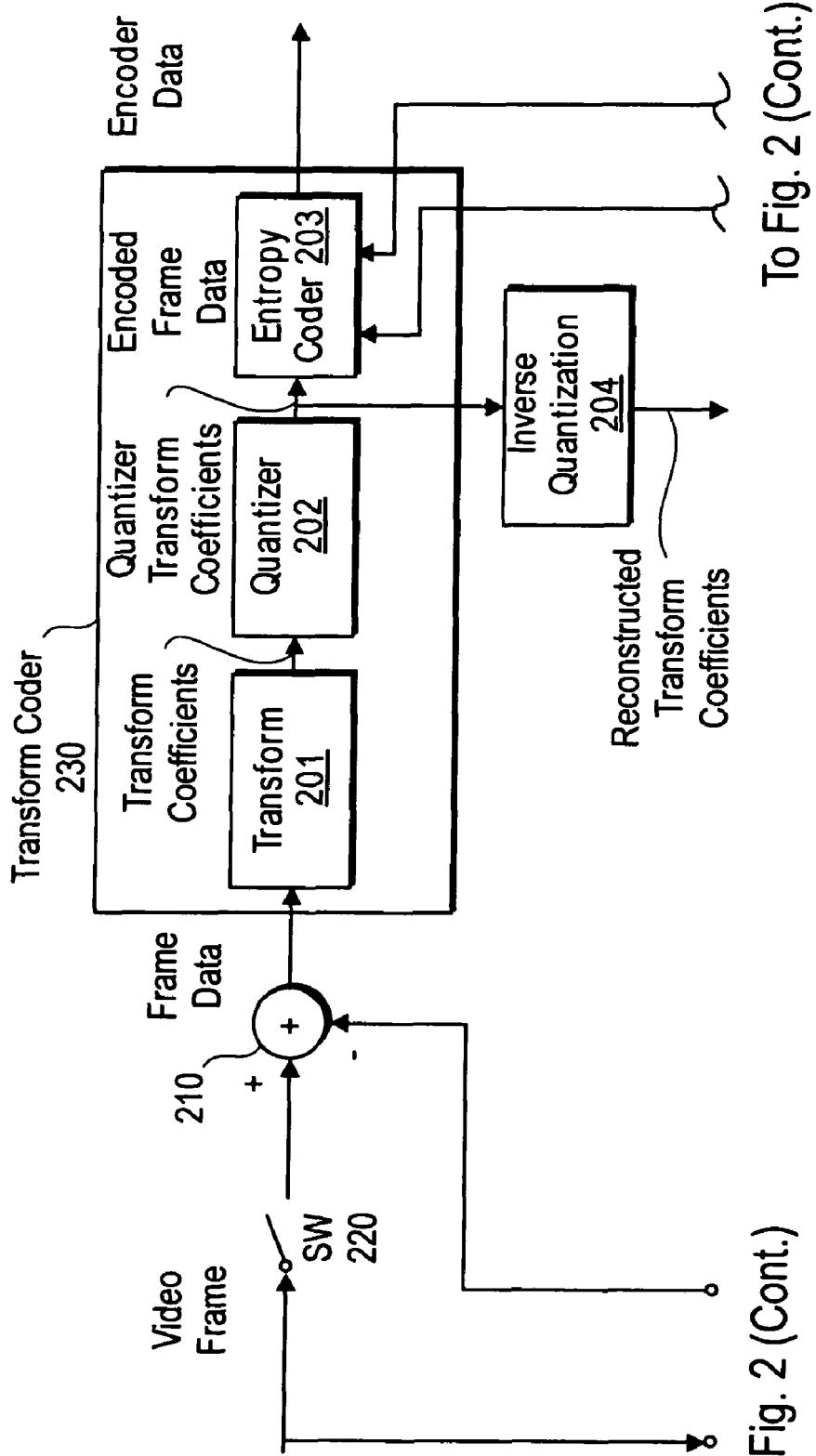
FIG. 2 is a block diagram of video coder.
Figure 2:
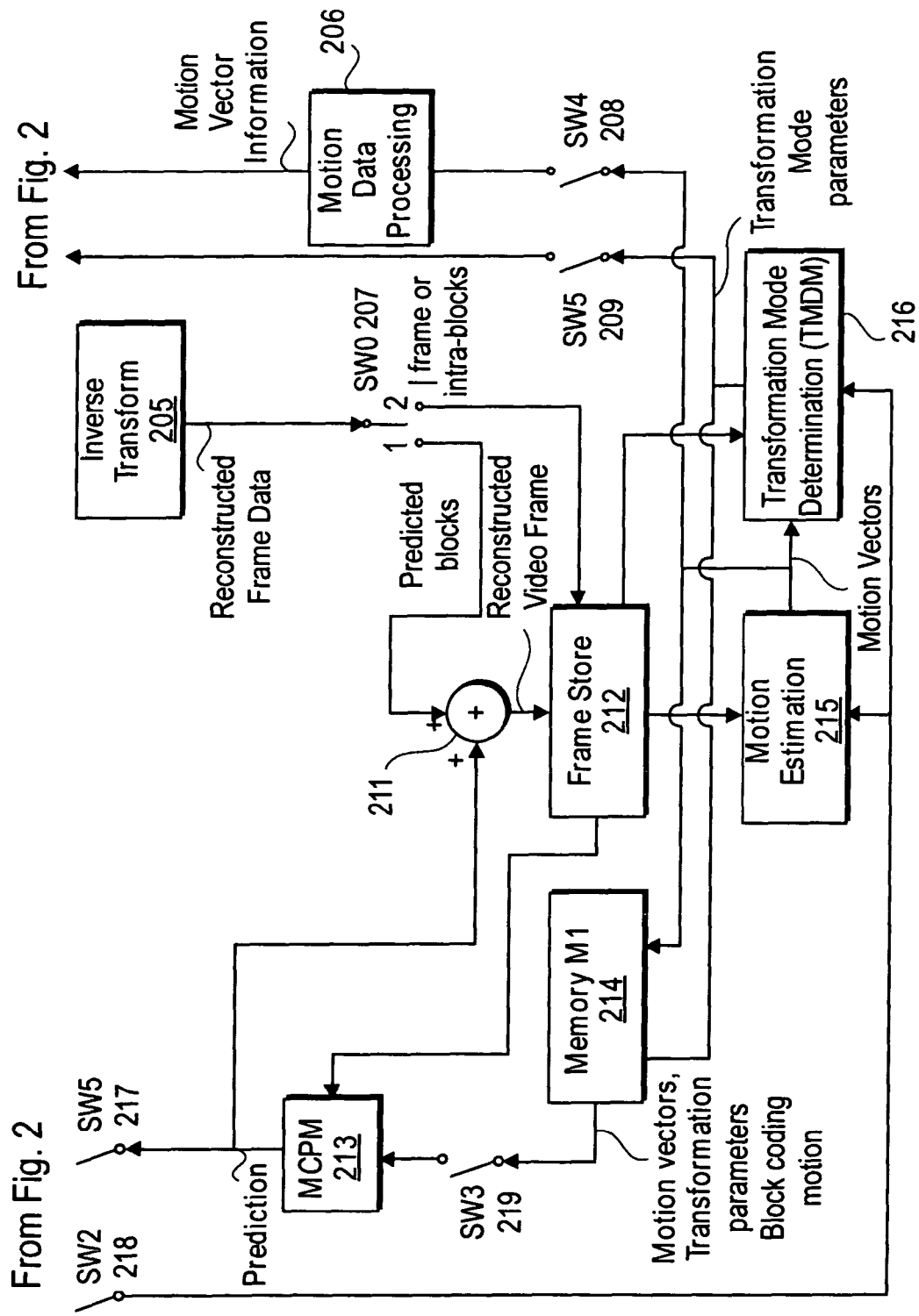

FIG. 2 is a block diagram of one embodiment of a video coder (VC). Referring to FIG. 2, the video coder includes a motion estimation module (MEM) 215, a motion-compensated prediction module (MCPM) 213, a transformation-model determination module (TMDM) 216, a memory 214, a transform coding module (TCM) 230, a motion data processing module (MDPM) 206, a frame store (FS) (memory) 212, and switches SW 207-209 and 217-220. Transform coder (TCM) 230 includes a transform module 201, a quantizer module 202, and an entropy coding module 203. The frame data at the input of the TCM 230 may consist of video frames, or displaced frame difference (DFD) frames. A DFD frame is obtained in the video coder by taking the difference (using subtractor 210) between data in a video frame and its prediction generated at the output of MCPM 213. MCPM 213 generates a prediction based on data consisting of motion-compensated reconstructed video frames stored in FS 212. The motion compensation takes place using motion information generated by the motion MEM 215 and transformation model information generated by TMDM 216. This process is enabled by a configuration of the switches in FIG. 2 that will be discussed below. Alternatively, when the video coder directly encodes a video frame corresponding to the intra-coding mode of conventional coders, without the use of prediction, MEM 215, TMDM 216, MCPM 213, and MDPM 213 are not utilized. In one embodiment, the video coder operates sequentially on block-partitioned frame data, which consists of luminance or chrominance values at each position in a block.

Figure 3:
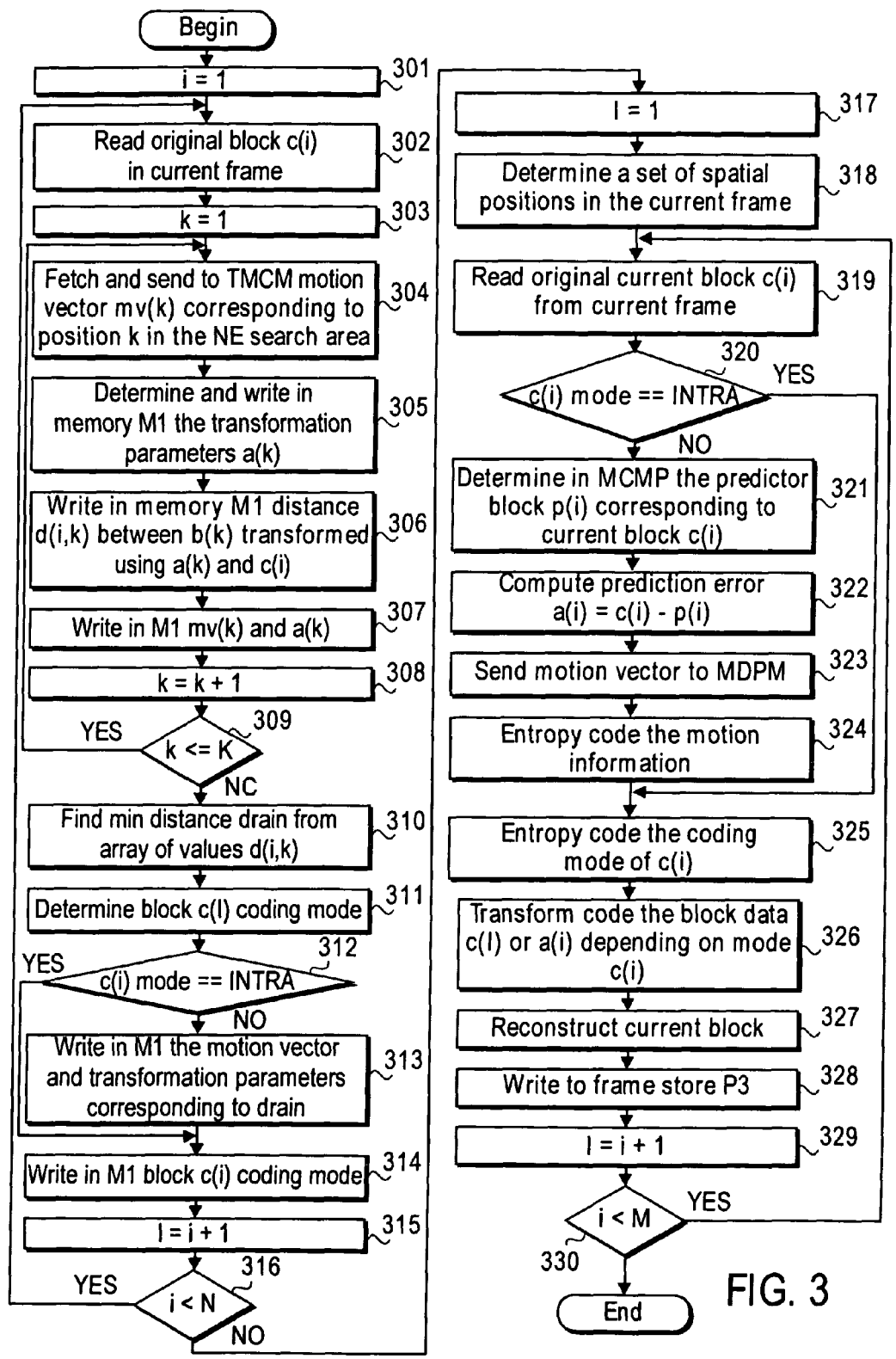
FIG. 3 is a flow diagram of one embodiment of a video coding process.
Figure 4:
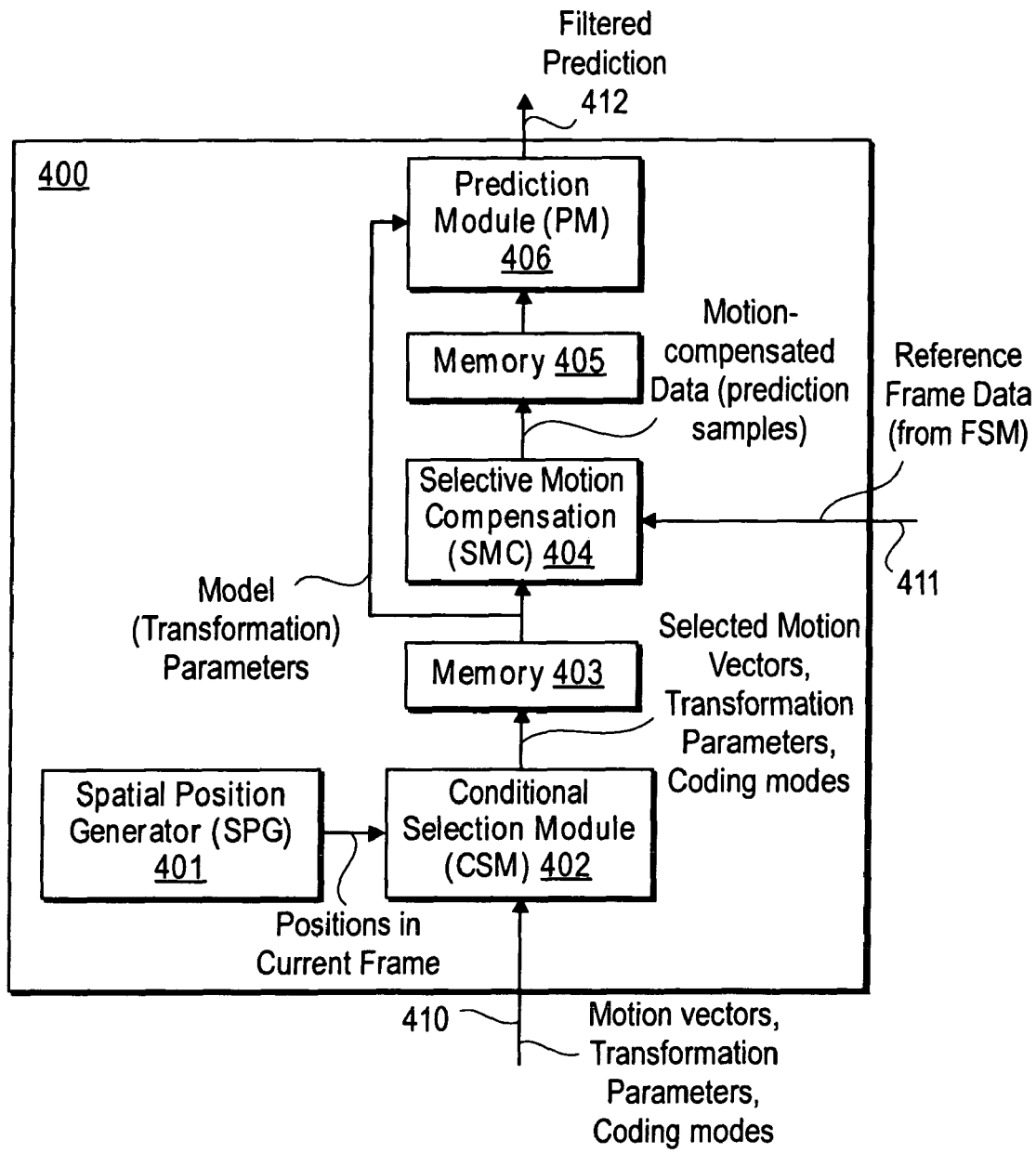
FIG. 4 is a block diagram of one embodiment of a motion-compensated prediction module.

FIG. 3 is a flow diagram of one embodiment of a process performed by the VC shown in FIG. 2. The process is performed by processing logic that may comprise hardware (circuitry, dedicated logic, etc.), software (such as is run on a general purpose computer system or a dedicated machine), or a combination of both.

Referring to FIG. 3, blocks from an original current frame are read and processed sequentially as described by the following process, until all blocks of the current frame have been processed. Processing logic initializes a counter variable (index) for the blocks in the current frame, i, to zero (processing block 301). In a first phase of the VC operation, switches in the block diagram of FIG. 2 are configured as follows: SW1 is open, SW2 is closed, SW3 is open, SW4 is open, SW5 is open, and SW6 is open. Processing logic reads a current uncompressed block c(i) in the current frame (processing block 302).

Referring to FIG. 3, blocks from an original current frame are read and processed sequentially as described by the following process, until all blocks of the current frame have been processed. Processing logic initializes a counter variable (index) for the blocks in the current frame, i, to 1 (processing block 301). In a first phase of the VC operation, switches in the block diagram of FIG. 2 are configured as follows: SW1 is open, SW2 is closed, SW3 is open, SW4 is open, SW5 is open, and SW6 is open.

Processing logic reads a current uncompressed block c(i) in the current frame (processing block 302).

Processing logic tests whether there are any more candidate positions in the search area in the reference frame (k<=K) (processing block 309). Processing logic increments the index k (processing block 308). If there are remaining candidate positions in the search area in a reference frame (i.e., k<K), processing transitions to processing block 304 and another block b(k) in the reference frame is selected and the process described above is repeated. If not, processing transitions to processing block 310.

When all K search area positions from a reference frame corresponding to the current block c(i) have been visited, processing logic in TMDM 216 finds the smallest error dmin among the array of values d(i,k) stored in memory 214, which corresponds to a specific reference block denoted by bmin (processing block 310). Processing logic MEM 215 determines the mode mode(i) of coding of the current block by comparing a cost of encoding the current block c(i) by intra coding its samples with a cost of encoding block c(i) predictively with respect to the block bmin (processing block 311). If the first cost is smaller, the mode of the block c(i) is marked as INTRA.

Processing logic tests whether the mode of the block c(i) is marked INTRA (processing block 312). If not, processing logic in TMDM 216 saves in memory 214 the transformation (T) parameters α associated with dmin and bmin (processing block 313) and transitions to processing block 314. If so, processing logic transitions directly to processing block 314. At processing block 314, processing logic writes the mode of the current block to memory 214 (processing block 314), and the process moves on to the next block c(i) in the current frame. Processing logic in MEM also saves the motion vector corresponding to dmin and bmin in memory 214.

Processing logic then increments index i (processing block 315) and tests whether there are more blocks in the current frame (i<N) (processing block 316). If so, processing logic transitions to processing block 302 and processing repeats. If not, processing transitions to processing block 317.

Once all the blocks in the current frame have been processed as described above, a new process is initiated whereby blocks c(i) from the current frame are read sequentially. For this part of the operation of the video coder the switches in FIG. 2 have the following initial configuration: SW1 is closed, SW2 is open, SW3 is closed, SW4, SW5, SW6 are open if the current block mode is INTRA and closed if the mode is not INTRA. SW0 is in position 1 if the current block mode is INTRA, and in position 2 otherwise.

Figure 7:
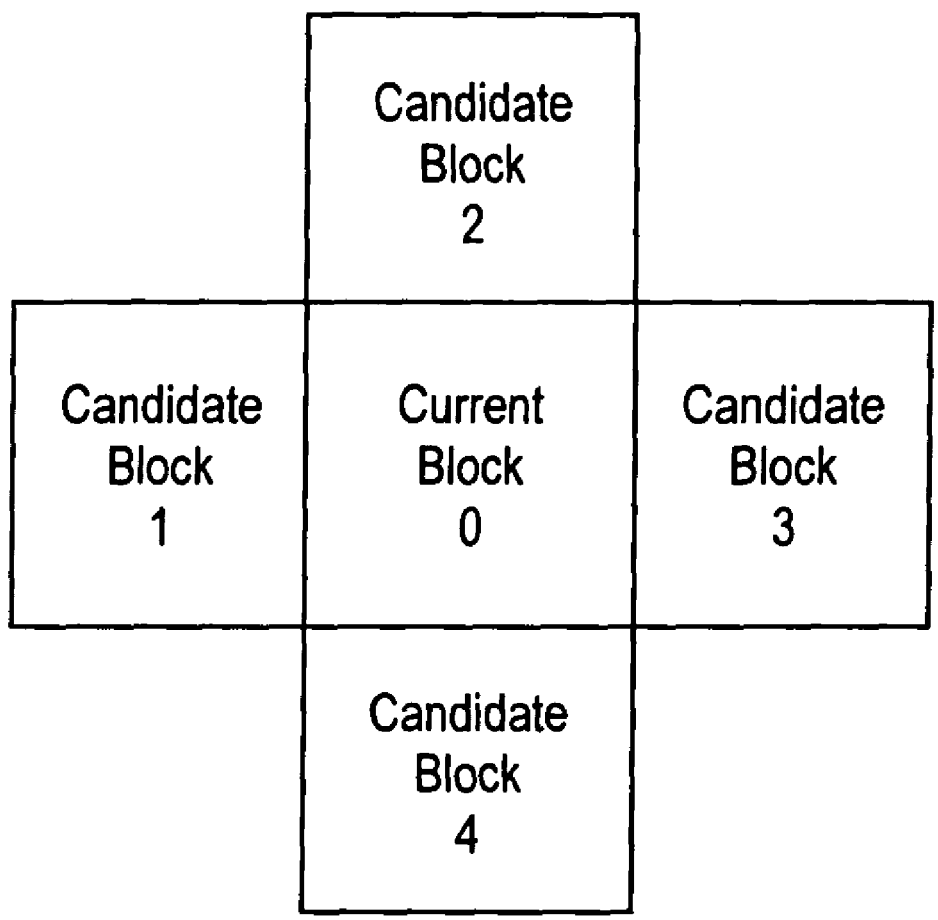
FIG. 7 is a block diagram of the blocks corresponding to spatial positions generated by one embodiment of a spatial position generator module.

At processing block 317, processing logic resets the index i. Then processing logic in MCPM 213 generates a set S of spatial positions in the current frame corresponding to a set of blocks in that frame (processing block 318). In one embodiment, this set of spatial positions specifies neighboring blocks of the current block being coded in the current frame as follows. The positions of the left, top, right, and bottom neighbors of the current block c(i) are included in set S, as illustrated in FIG. 7.

Processing logic reads a current block c(i) from the uncompressed current frame (processing block 319). Processing logic reads the mode mode(i) of the current block c(i) from the memory 214 and tests whether the mode is INTRA (processing block 320).

If this mode is INTRA, processing logic transitions directly to processing block 325. If the mode of the current block read is not INTRA, processing logic sends the motion vector data corresponding to the current block to MDPM 213 where it is processed and sent to the entropy coder module for encoding. More specifically, processing logic determines a prediction error e(i) in the VC by determining the prediction block p(i) corresponding to the current block c(i) in MCPM 213 (processing block 321), takes the difference between the current block c(i) and the prediction p(i) produced by MCPM 213 (processing block 322), sends the motion vector to MCPM 213 (processing block 323), and entropy codes the motion information (processing block 324).

At processing block 325, processing logic entropy codes the coding mode(i). Thereafter, processing logic sends the current block data to TCM 230 where it is transformed coded (processing logic 326). The transform coding may be applied to block data c(i) or prediction error data e(i) depending on the mode(i), which results in encoded block data. After transform coding, processing logic reconstructs the current block (processing block 327) and stores the reconstructed version of the current block in FS 212 as in conventional video coders (processing block 328).

At processing block 325, processing logic entropy codes the coding mode(i). Thereafter, processing logic sends the current block data to TCM 230 where it is transformed coded (processing logic 326). The transform coding may be applied to block data c(i) or prediction error data e(i) depending on the mode(i), which results in encoded block data. After transform coding, processing logic reconstructs the current block (processing block 327) and stores the reconstructed version of the current block in FS 212 as in video coders (processing block 328).

In one embodiment, TMDM 216 has the following inputs: motion information generated by MEM 214 (in the form of motion vectors), current video frame data (blocks), and reconstructed frame data from the frame store. As in conventional approaches, for a given transformation-model order, based on these inputs and according to an optimality criterion (e.g., least-squares criterion), TMDM 216 determines the parameters a of the transformation model T and stores them in memory 214. This is done to satisfy the optimality criterion in terms of the difference between a current block c from the current video frame, and a reference block transformed using the parameters α, whose position is given by the motion vector information received from MEM 215. The output of TMDM 216 includes the parameters of the transformation model associated with reference blocks. These parameters are saved in the memory module 214.

In one embodiment, TMDM 216 has the following inputs: motion information generated by MEM 214 (in the form of motion vectors), current video frame data (blocks), and reconstructed frame data from the frame store. As in known approaches, for a given transformation-model order, based on these inputs and according to an optimality criterion (e.g., least-squares criterion), TMDM 216 determines the parameters a of the transformation model T and stores them in memory 214. This is done to satisfy the optimality criterion in terms of the difference between a current block c from the current video frame, and a reference block transformed using the parameters α, whose position is given by the motion vector information received from MEM 215. The output of TMDM 216 includes the parameters of the transformation model associated with reference blocks. These parameters are saved in the memory module 214.

SPGM 401 sends information regarding block positions in the current frame to CSM 402. CSM 402 also receives the motion vectors, transformation parameters, and coding modes (410) corresponding to blocks in the current frame. From these inputs, CSM 402 selects a subset of the motion vectors, transformation parameters and coding modes, which are stored in memory 403. SMCM 404 receives the reference frame data 411 from frame store 212 along with model parameters from memory 403. These model parameters are the transformation parameters. Using these inputs, SMCM 404 generates motion-compensated data in the form of predictive samples, which are stored in memory 405. Prediction module 406 receives the model (transformation) parameters from memory 403 along with motion-compensated data (predictive samples) from memory 405 and generates a filtered prediction 412 in response thereto.

Figure 5:
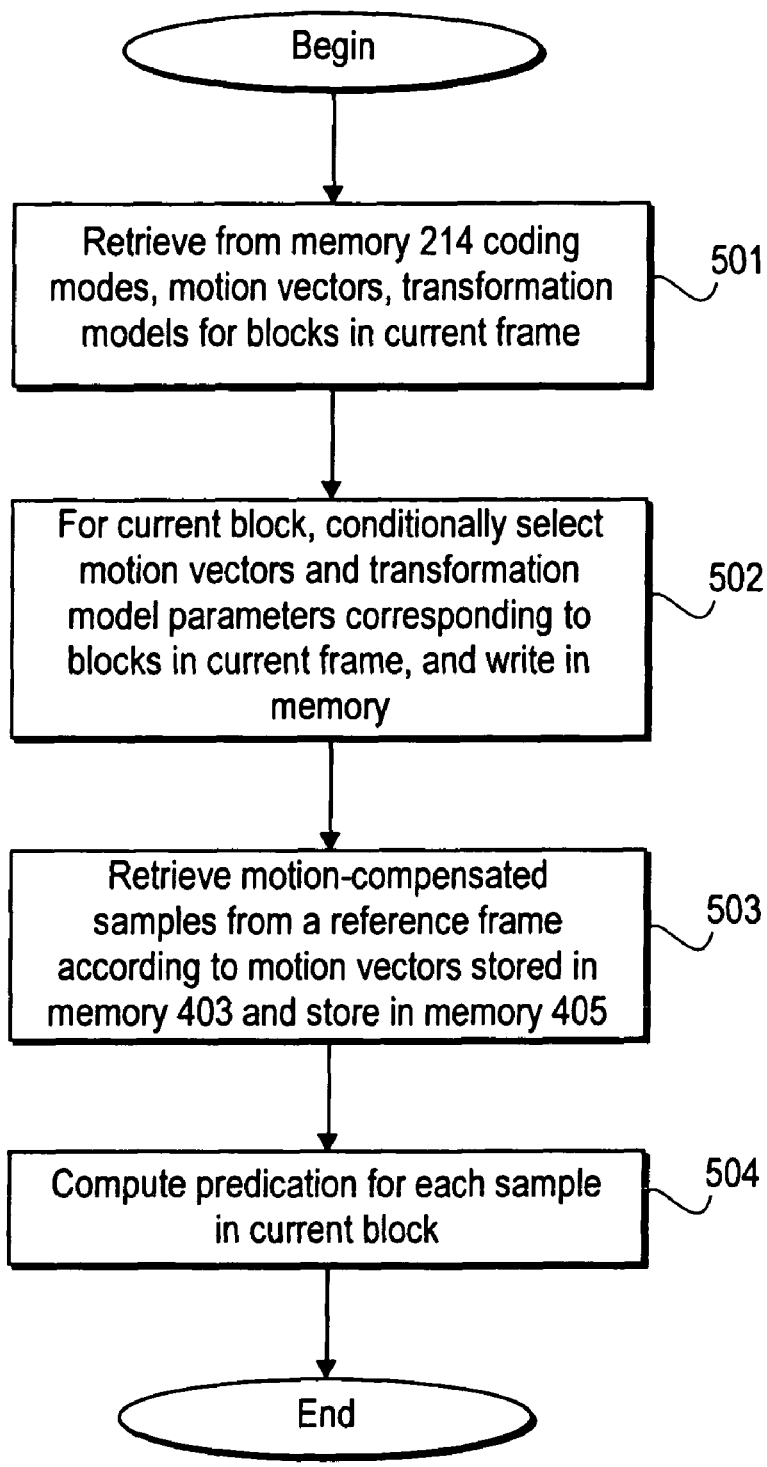
FIG. 5 is a flow diagram of one embodiment of a motion-compensated prediction module process.

FIG. 5 is a flow diagram of one embodiment of a motion-compensated prediction process performed by a MCPM. The process is performed by processing logic that may comprise hardware (circuitry, dedicated logic, etc.), software (such as is run on a general purpose computer system or a dedicated machine), or a combination of both.

Referring to FIG. 5, processing logic in the MCPM retrieves the coding modes, motion vectors, and transformation model parameters for all the blocks in the current frame from memory 214 (processing block 501). Then, processing logic conditionally selects, for each block, motion vectors and transformation model parameters corresponding to that block and other blocks in the current video frame whose positions are specified in the set S generated by SPGM 401, and stores them in memory 403 (processing block 502). For each sample in a predicted block in the current frame, processing logic in SMC 404 then retrieves motion-compensated samples from a reference frame according to motion vectors stored in memory 403 and stores these predictive samples in memory 405 (processing block 503). Processing logic in PM 406 retrieves the stored predictive samples from memory 405, as well the transformation model parameters stored in 403, and computes the prediction P for each sample of the current block (processing block 504).

In one embodiment, CSM 402 retrieves the coding mode, motion vector, and transformation parameters corresponding to the current block c from memory 214, as they were generated by MEM 215 and TMDM 216, respectively. CSM 402 receives another input consisting of a set S of spatial positions in the current frame from SPGM 401. CSM 402 outputs selected motion vectors, transformation parameters, and block coding modes which it writes into memory 403 of MCPM 400.

Figure 6:
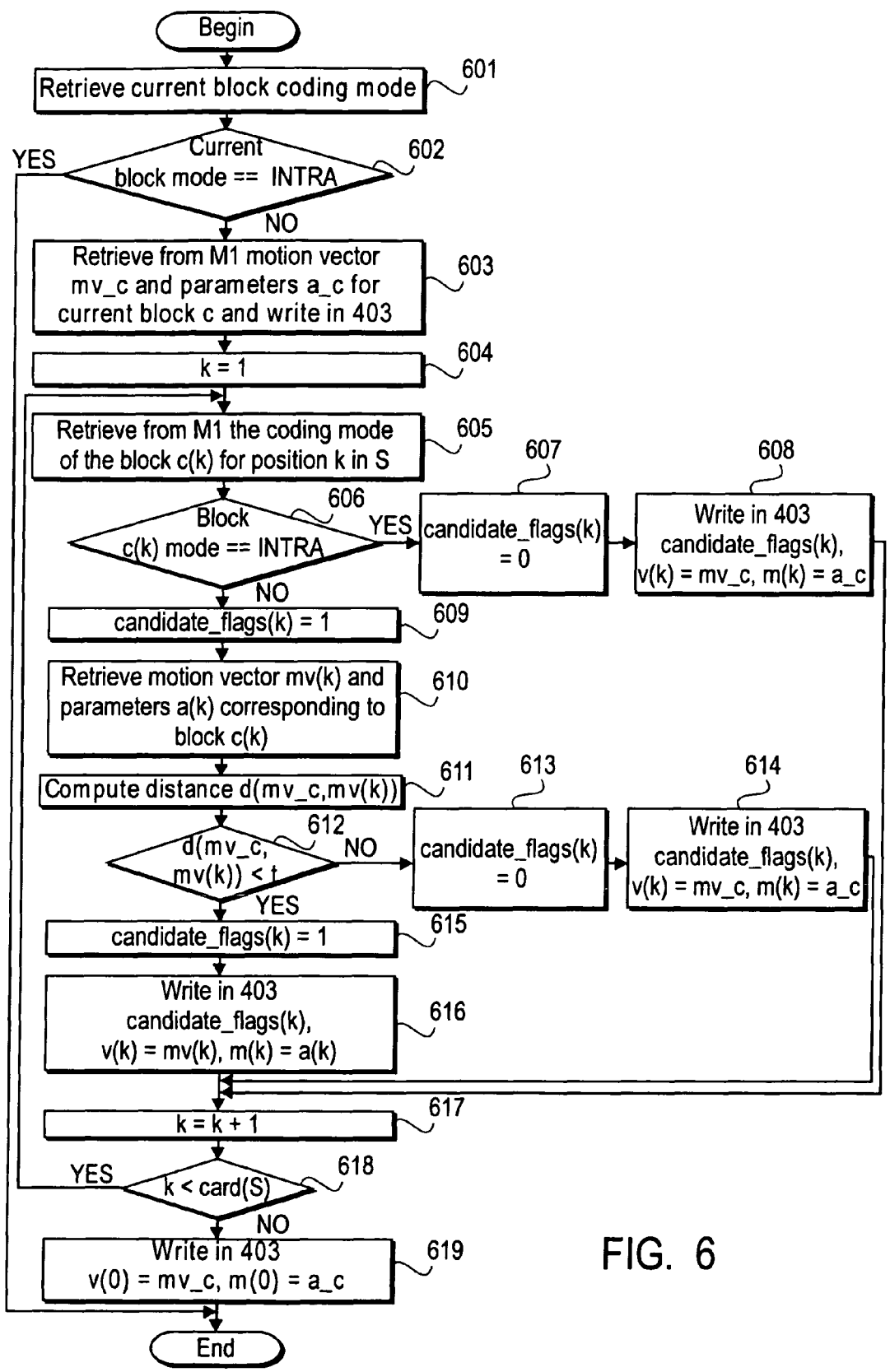
FIG. 6 is a flow diagram of one embodiment of a conditional selection process in the conditional selection module.

FIG. 6 is a flow diagram of one embodiment of a conditional selection process performed by a CSM. The process is performed by processing logic that may comprise hardware (circuitry, dedicated logic, etc.), software (such as is run on a general purpose computer system or a dedicated machine), or a combination of both.

Referring to FIG. 6, CSM 402 retrieves the block coding mode corresponding to the current block c from memory 214 (processing block 601). Processing logic then tests whether the current block mode is INTRA (processing block 602). If the coding mode for the current block c is INTRA, no further action is taken by CSM 402 on that block and the process ends. Otherwise, if the coding mode for the current block is not INTRA, CSM 402 retrieves from memory 214 a motion vector mv_c and corresponding transformation parameters a_c for the current block c and writes them into memory 403 (processing block 603).

Processing logic resets an index k to 1 (processing block 604). Next, CSM 402 sequentially retrieves from memory 214 the coding mode of other blocks forming a set B in the current frame, whose spatial positions are determined by the set S generated by SPGM 401. To each of the blocks in the set B corresponds a CSM-maintained value in an array of flags denoted by candidate_flags in memory 403. More specifically, processing logic retrieves the coding mode of the block c(k) for position k in the set S (processing block 605). Processing logic then tests whether the block c(k) mode is INTRA (processing block 606). For the k-th block in set B corresponding to the k-th spatial position in set S, if its coding mode is INTRA (as retrieved from memory 214), processing logic sets the corresponding value candidate_flags(k) to 0 (processing block 607), writes it into memory 403, and sets the motion vector v(k) equal to mv_c and the transform parameters m(k) equal to a_c of the current block, which are also written in memory 403 and associated with the current position in the array candidate_flags. Thereafter, processing transitions to processing block 617 to continue onto processing next block in B.

Otherwise, if the k-th block's coding mode is not INTRA, processing logic sets the candidate_flags(k) position to 1 (processing block 609) and processing logic in CSM 402 retrieves the corresponding motion vector mv(k) and transformation model parameters a(k) associated with that block, c(k), in B from memory 214 (processing block 610). Next, processing logic computes a distance metric denoted by d(mv_c,mv(k)) between the motion vector of the current block c and the motion vector associated with the block being examined from set B (processing block 611). In one embodiment, the distance metric is represented by the 11-norm of the motion vectors' difference.

Processing logic then tests whether the distance metric is less than a threshold t (processing block 612). If d(mv_c, mv(k)) is less than a threshold t, processing logic sets the candidate_flags(k) equal to 1 (processing block 615) and sets the motion vector v(k) equal to mv(k) and sets the parameters m(k) equal to a(k) (processing block 616). These are written into memory 403 and associated with the current position in the array candidate_flags. Thereafter, processing continues at processing block 617. Otherwise, if the distance d(mv_c,mv(k)) exceeds the threshold t, processing logic in CSM 402 sets the corresponding value candidate_flags(k) to 0 in memory 403 (processing block 613), sets the motion vector v(k) equal to mv_c and transformation model parameters m(k) equal to a_c, and saves them into memory 403 (processing block 614). Thereafter, processing continues at processing block 617.

At processing block 617, processing logic increments the index k. Processing logic then tests whether the k is less than the number of elements of set S (processing block 618). If it is, the process above is repeated for blocks corresponding to all the spatial positions contained in the set S received from SPGM 401. Thus, for each current block it processes from the set B, CSM 402 writes a corresponding value in the array candidate_flags in memory 403, as detailed above.

Once finished processing the blocks corresponding to all the spatial positions in the set S, for each value in this array, processing logic has written a corresponding motion vector v(k) and transformation model parameters a(k) into memory 403. For example, at the end of the processing of current block c by CSM 402, memory 403 may contain data as indicated in the following table (only an example):

TABLE 1

| Sample data written by CSM 402 in memory 403 | | | | | | | |
|---|---|---|---|---|---|---|---|
| k-th position in S | 1 | 2 | 3 | 4 | 5 | 6 | ... |
| candidate_flags(k) | 1 | 1 | 0 | 1 | 0 | 1 | ... |
| motion vectors v(k) | mv(1) | mv(2) | mv_c | mv(4) | mv_c | mv(6) | ... |
| model_params m(k) | a(1) | a(2) | a_c | a(4) | a_c | a(6) | ... |

In addition to these data, processing logic in CSM 402 also writes in memory 403 the vector mv_c and parameters a_c corresponding to the current block c, as presented above. These data are written at the zero-th index in the two motion vectors and parameters arrays v and m, i.e., v(0) equal to mv_c and m(0) equal to a_c (processing block 619). The value candidate_flags(0) equals 1 corresponds to the current block c being processed. Hence, the data stored in memory 403 in the example in Table 1 is augmented as in Table 2:

TABLE 2

| Augmented sample data written by CSM 402 in memory 403 | | | | | | | | |
|---|---|---|---|---|---|---|---|---|
| Index j | 0 | 1 | 2 | 3 | 4 | 5 | 6 | ... |
| candidate_flags(j) | 1 | 1 | 1 | 0 | 1 | 0 | 1 | ... |
| motion vectors v(j) | mv_c | mv(1) | mv(2) | mv_c | mv(4) | mv_c | mv(6) | ... |
| model_params.m(j) | a_c | a(1) | a(2) | a_c | a(4) | a_c | a(6) | ... |

For a non-intra current block c being processed that has spatial position (i0,j0) in the current frame, SMC module 404 reads from memory 403 the corresponding array candidate_flags produced as described above by CSM 402. The two-dimensional spatial position of a data sample inside the current block c is indexed by i,j. Thus, the frame position of a sample in block c is given by (i0+i, j0+j). For each sample c(i,j) in the current block c, SMC 404 retrieves a set of motion-compensated predictive samples from a reference frame as follows. The positions of the predictive samples in a reference frame are determined by motion vectors stored in memory 403 as generated by the CSM process. In one embodiment, the spatial positions contained in the set S generated by SPGM 401 correspond to K=4 neighboring blocks of the current block c, including the left, top, right, and bottom adjacent blocks to the current block. In this case, there are 4 neighboring blocks numbered as illustrated in FIG. 7. Thus, there are 4 positions in S, indexed by k=1 . . . 4. There are 4 corresponding motion vectors v(k) and 4 transformation model parameters m(k), k=1 . . . 4 stored in memory 403, as generated by the CSM process. In addition, memory 403 contains the motion vector value v(0) and model parameters m(0) for the current block at position (i0,j0) in the current frame. In this case, for each sample c(i,j) in block c, SMC 404 retrieves 3 motion-compensated data samples from the reference frame as follows. The predictive sample p(1) is obtained by retrieving the motion-compensated sample at position (i0+i+$\upsilon_x$(0),j0+j+$\upsilon_y$(0)) in the reference frame R, where $\upsilon_x$(0), $\upsilon_y$(0) represent the horizontal and vertical components of motion vector v(0).

$$p(1)=R(i0+i+\upsilon_x(0),j0+j+\upsilon_y(0))$$

In one embodiment, the size of a block is M×M. Thus, counter variables i and j index two-dimensionally the samples of that block by taking values from 1 to M. Then, in one embodiment, the remaining two predictive samples p(2) and p(3) from reference frame R are retrieved according to the following logical conditions by using the motion vectors $\upsilon$(k), k=1 . . . 4:

If ($i>=1$ AND $i<=M/2$) AND ($j>=1$ AND $j<=M/2$)

$$p(2)=R(i0+i+v_x(1),j0+j+v_y(1))$$

$$p(3)=R(i0+i+v_x(2),j0+j+v_y(2))$$

Else if ($i>=1$ AND $i<=M/2$) AND ($j>M/2$ AND $j<=M$)

$$p(2)=R(i0+i+v_x(2),j0+j+v_y(2))$$

$$p(3)=R(i0+i+v_x(3),j0+j+v_y(3))$$

Else if ($i>M/2$ AND $i<=M$) AND ($j>=1$ AND $j<=M/2$)

$$p(2)=R(i0+i+v_x(1),j0+j+v_y(1))$$

$$p(3)=R(i0+i+v_x(4),j0+j+v_y(4))$$

Else if ($i>M/2$ AND $i<=M$) AND ($j>M/2$ AND $j<=M$)

$$p(2)=R(i0+i+v_x(3),j0+j+v_y(3))$$

$$p(3)=R(i0+i+v_x(4),j0+j+v_y(4))$$

where $v_x(k)$ and $v_y(k)$, k=1 . . . 4 are the horizontal and vertical components of motion vector v(k). The predictive samples p(l), l=1 . . . 3 retrieved from reference frame R and corresponding to each sample c(i,j) in current block c are stored in memory 405. In an alternate embodiment, the motion vectors of a different number of blocks having positions as specified by the values in set S are used by SMC 404 to retrieve motion compensated predictive samples p(l) for each sample in current block c.

If the coding mode of the current block c being processed at the input of MCPM 213 is not INTRA, prediction module 406 generates a prediction for each of the data samples having coordinates (i,j) in the current block c as follows. The prediction for each sample c(i,j) is computed by using the corresponding predictive samples p(l) generated and stored by SMC 404 in memory 405 according to the process described above for SMC 404. The model parameters m(0) stored in memory 403 for the current block, and the parameters m(k), k=1 . . . K corresponding to the array candidate_flags associated with the current block are also retrieved by prediction module 406 from memory 403. In one embodiment, prediction module 406 then forms a set of values mf(n), n=1 . . . 3 using the model parameters retrieved from memory 403 based on the following logical conditions and depending on the position (i,j) of the data sample in the block c for which the prediction P is being formed. In one embodiment, the model parameters that are used in the computation of the prediction P are determined as follows:

$$mf(1)=m(0)$$

If ($i>=1$ AND $i<=M/2$) AND ($i>=1$ AND $j<=M/2$)

$$mf(2)=m(1)$$

$$mf(3)=m(2)$$

Else if ($i>=1$ AND $i<=M/2$) AND ($j>M/2$ AND $j<=M$)

$$mf(2)=m(2)$$

$$mf(3)=m(3)$$

Else if ($i>M/2$ AND $i<=M$) AND ($j>=1$ AND $j<=M/2$)

$$mf(2)=m(1)$$

$$mf(3)=m(4)$$

Else if ($i>M/2$ AND $i<=M$) AND ($j>M/2$ AND $j<=M$)

$$mf(2)=m(3)$$

$$mf(3)=m(4)$$

To each set of transformation model parameters mf(l), l=1 ... 3, corresponds a transformation $T_l(.)$, l=1 ... 3. A prediction P for the current sample c(i,j) is then formed as a linear combination of predictive samples as follows:

$$P(i,j)=(w1(i,j)*T_1(p(1))+w2(i,j)*T_2(p(2))+w3(i,j)*T_3(p(3)))/W,$$

where w1(i,j), w2(i,j), w3(i,j) are weights whose values are stored in two-dimensional arrays w1, w2, w3 of size M×M, and $$w1(i,j)+w2(i,j)+w3(i,j)=W$$

The arrays w1, w2, w3 are retrieved by prediction module 406 from memory 403 where they are stored. The process described above is illustrated by the flow diagram of FIG. 8.

Figure 8:
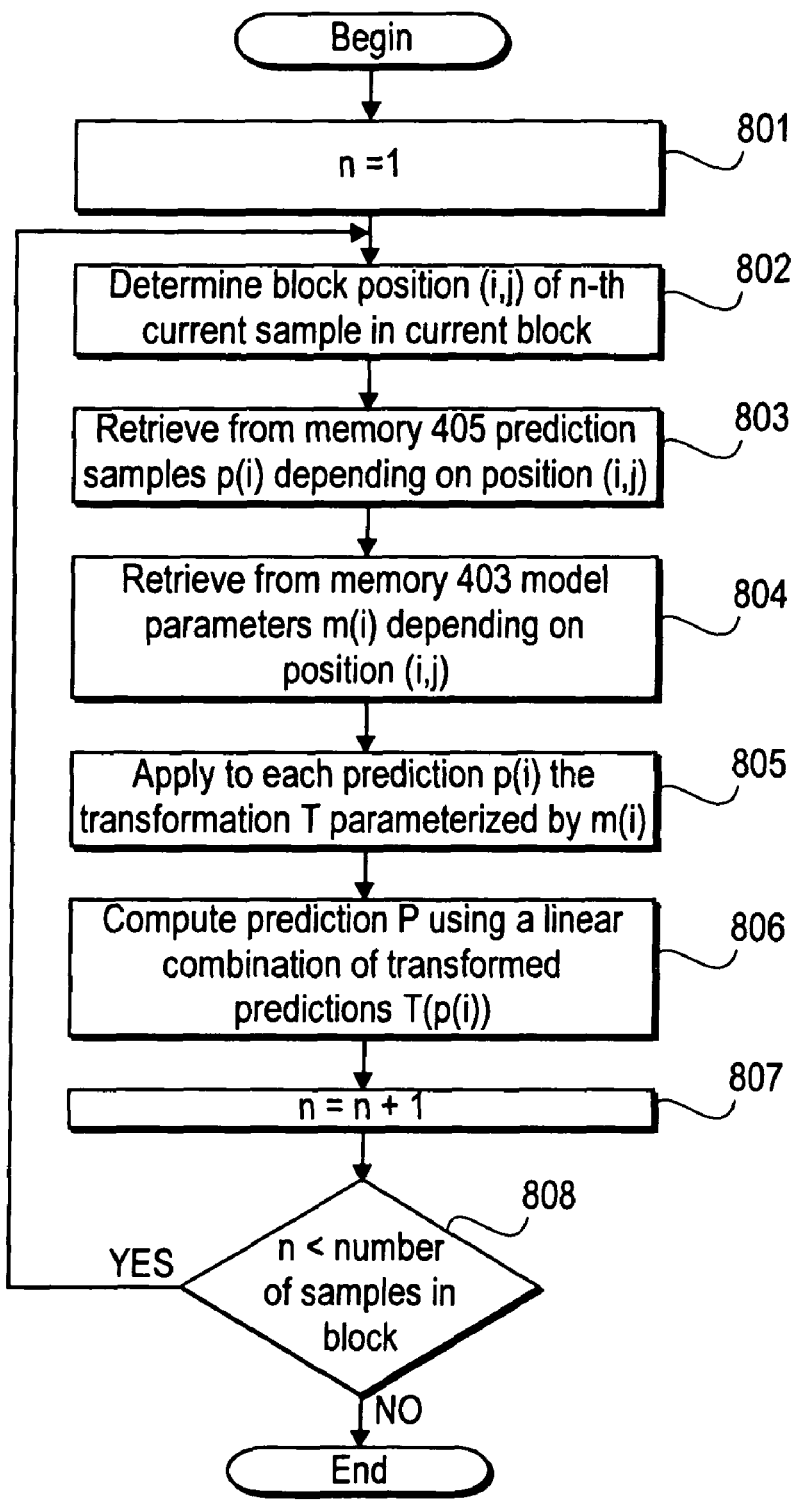
FIG. 8 is a flow diagram of one embodiment of a prediction module process-1.

The process described in the flow diagram of FIG. 8 is performed by processing logic that may comprise hardware (circuitry, dedicated logic, etc.), software (such as is run on a general purpose computer system or a dedicated machine), or a combination of both.

Referring to FIG. 8, the process begins by processing logic setting the variable n equal to 1 (processing block 801). Next, processing logic determines the block position (i,j) of the n-th current sample in the current block (processing block 802). After determining the block position, processing logic retrieves the prediction samples p(i) depending on the position (i,j) from memory 405 (processing block 803). Processing logic also retrieves the model parameters m(i) based on the position (i,j) from memory 403 (processing block 804). Using the information, processing logic applies, to each prediction p(i), the transformation T parameterized by m(i) (processing block 805) and computes the prediction P using linear combination of transform predictions T(p(i)) (processing block 806).

After computing the prediction, processing logic increments variable n by 1 (processing block 807) and tests whether n is less than the number of samples in the block (processing block 808). If it is, processing logic transitions the processing block 802 and the process is repeated for the next sample in the current block. If not, the process ends.

In an alternative embodiment, for each block in the current frame, sample-wise model parameters mp(i,j), i,j=1 ... M are determined from the block model parameters m(1) stored in memory 405 as follows (the neighboring blocks to a current block are labeled as illustrated in FIG. 6):

If ($i>=1$ AND $i<=M/2$) AND ($j>=1$ AND $j<=M/2$)

$$mp(i,j)=(h1(i,j)*m(0)+h2(i,j)*m(1)+h3(i,j)*m(2))/H$$

Else if ($i>=1$ AND $i<=M/2$) AND ($j>M/2$ AND $j<=M$)

$$mp(i,j)=(h1(i,j)*m(0)+h2(i,j)*m(2)+h3(i,j)*m(3))/H$$

Else if ($i>=M/2$ AND $i<=M$) AND ($j>=1$ AND $j<=M/2$)

$$mp(i,j)=(h1(i,j)*m(0)+h2(i,j)*m(1)+h3(i,j)*m(4))/H$$

Else if ($i>=M/2$ AND $i<=M$) AND ($j>M/2$ AND $j<=M$)

$$mp(i,j)=(h1(i,j)*m(0)+h2(i,j)*m(3)+h3(i,j)*m(4))/H$$

where the h1, h2, h3 values are stored in M×M arrays in memory 405, and h1(i,j)+h2(i,j)+h3(i,j)=H To the set of transformation model parameters mp(i,j), i,j=1 ... M for sample c(i,j) in block k of the current frame, corresponds a set transformations $S^k_{i,j}(.)$, i,j=1 ... M.

Considering a current block in the current frame, with the labeling of neighboring blocks as in FIG. 7, in one embodiment, the prediction P(i,j) for the current sample c(i,j) in block c is then formed as follows:

If ($i>=1$ AND $i<=M/2$) AND ($j>=1$ AND $j<=M/2$)

$$P(i,j)=(w1(i,j)*S^0_{i,j}(p(1))+w2(i,j)*S^1_{i,j}(p(2))+w3(i,j)*S^2_{i,j}(p(3)))/W,$$

Else if ($i>=1$ AND $i<=M/2$) AND ($j>M/2$ AND $j<=M$)

$$P(i,j)=(w1(i,j)*S^0_{i,j}(p(1))+w2(i,j)*S^2_{i,j}(p(2))+w3(i,j)*S^3_{i,j}(p(3)))/W,$$

Else if ($i>M/2$ AND $i<=M$) AND ($j>=1$ AND $j<=M/2$)

$$P(i,j)=(w1(i,j)*S^0_{i,j}(p(1))+w2(i,j)*S^1_{i,j}(p(2))+w3(i,j)*S^4_{i,j}(p(3)))/W,$$

Else if ($i>M/2$ AND $i<=M$) AND ($j>M/2$ AND $j<=M$)

$$P(i,j)=(w1(i,j)*S^0_{i,j}(p(1))+w2(i,j)*S^3_{i,j}(p(2))+w3(i,j)*S^4_{i,j}(p(3)))/W,$$

where $S^k_{i,j}(.)$ represents the transformation corresponding to the blocks k labeled as in FIG. 7 for a given current block in the current frame. The process described above is illustrated by the flow diagram in FIG. 9.

Figure 9:
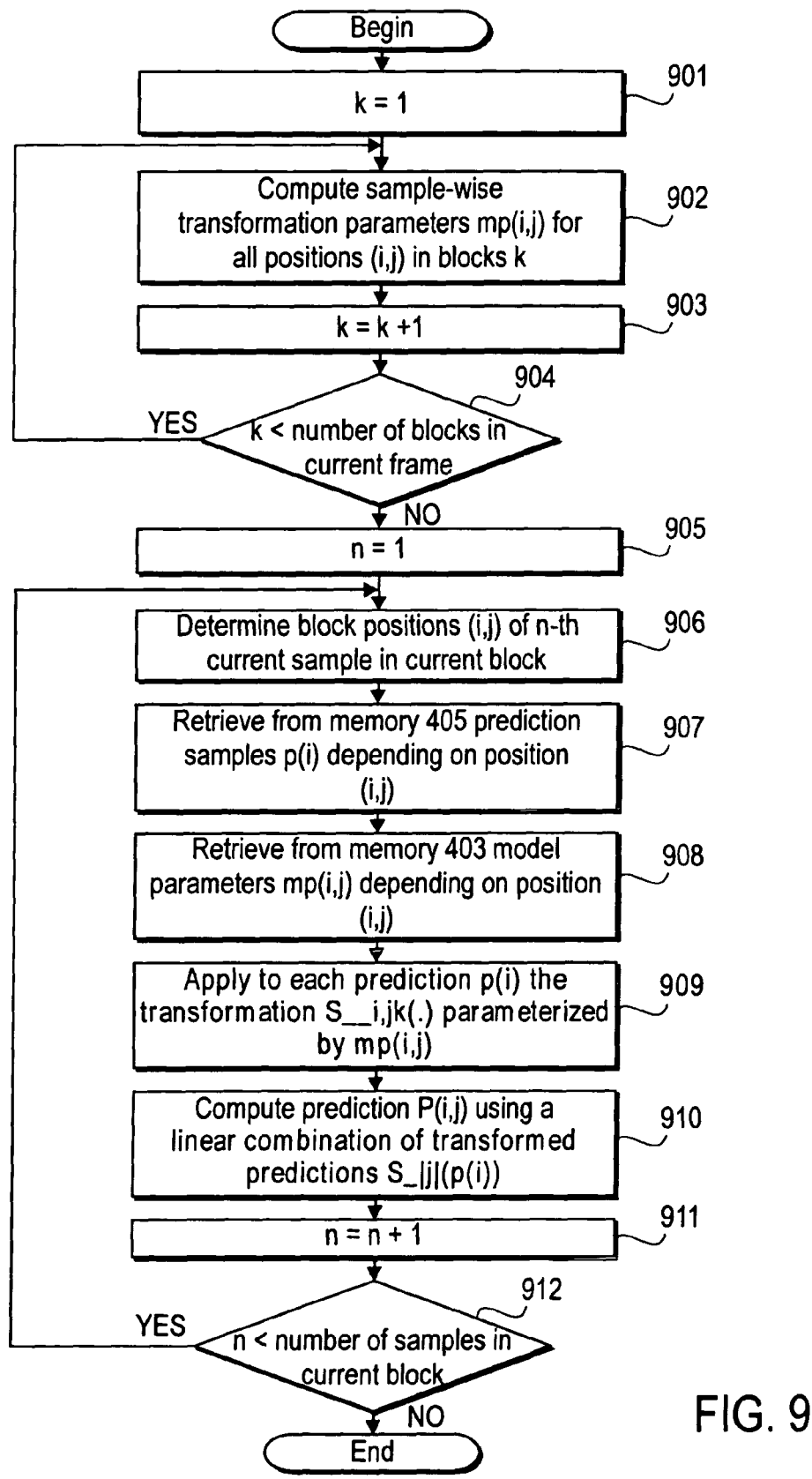
FIG. 9 is a flow diagram of one embodiment of a prediction module process-2.

The process in FIG. 9 is performed by processing logic that may comprise hardware (circuitry, dedicated logic, etc.), software (such as is run on a general purpose computer system or a dedicated machine), or a combination of both.

Referring to FIG. 9, the process begins by processing logic setting the index variable k equal to 1 (processing block 901). Processing logic then computes sample-wise transformation parameters mp(i,j) for all positions (i,j) in block k (processing block 902). Next, processing logic increments the variable k by 1 (processing block 903) and tests whether the value of k is less than the number of blocks in the current frame (processing block 904). If it is, processing logic transitions to processing block 902 and the process repeats until the sample-wise transformation parameters are computed for all the blocks. If not, the process transitions to processing block 905 where the variable n is initialized to 1.

Processing logic determines the block position (i,j) of the n-th current sample in the current block (processing block 906). After determining the block position, processing logic retrieves the prediction samples p(i) for the position (i,j) from memory 405 (processing block 907) and retrieves the model parameters mp(i,j) for the position (i,j) from memory 403 (processing block 908). Using the data retrieved from these memories, processing logic applies the transformation $S^1_{i,j}(.)$, for l equal to 0 ... 4, parameterized by mp(i,j) to each prediction (processing block 909) and computes the prediction P(i,j) using a linear combination of transforms prediction $S^1_{i,j}(p(i))$ (processing block 910).

After computing the prediction, processing logic increments variable n by 1 (processing block 911) and tests whether the value of n is less than the number of samples in the current block (processing block 912). If is it, processing transitions to processing block 906 and the process repeats for all the samples in the current block. If not, the process ends.

In an alternate embodiment, the prediction P(i,j) corresponding to the sample c(i,j) in the current block c is computed as follows (the $S^k_{i,j}(.)$ are computed in the same manner as above):

If $(i>=1$ AND $i<=M/2)$ AND $(j>=1$ AND $j<=M/2)$ $P(i,j)=(w1(i,j)*S^0_{i,j}(p(1))+w2(i,j)*S^1_{i,j}(P(1))+w3(I,j)*S^2_{i,j}(p(1)))/W,$

Else if $(i>=1$ AND $i<=M/2)$ AND $(j>M/2$ AND $j<=M)$ $P(i,j)=(w1(i,j)*S^0_{i,j}(p(1))+w2(i,j)*S^2_{i,j}(P(1))+w3(i,j)*S^3_{i,j}(p(1)))/W,$ Else if $(i>M/2$ AND $i<=M)$ AND $(j>=1$ AND $j<=M/2)$ $P(i,j)=(w1(i,j)*S^0_{i,j}(p(1))+w2(i,j)*S^1_{i,j}(p(1))+w3(i,j)*S^4_{i,j}(p(1)))/W,$ Else if $(i>M/2$ AND $i<=M)$ AND $(j>M/2$ AND $j<=M)$ $P(i,j)=(w1(i,j)*S^0_{i,j}(p(1))+w2(i,j)*S^3_{i,j}(p(1))+w3(i,j)*S^4_{i,j}(p(1)))/W,$ where $S^k_{i,j}(.)$ represents the transformation corresponding to the blocks k labeled as in FIG. 7 for a given current block in the current frame. The process described above is illustrated by the flow diagram of FIG. 10.

Figure 10:
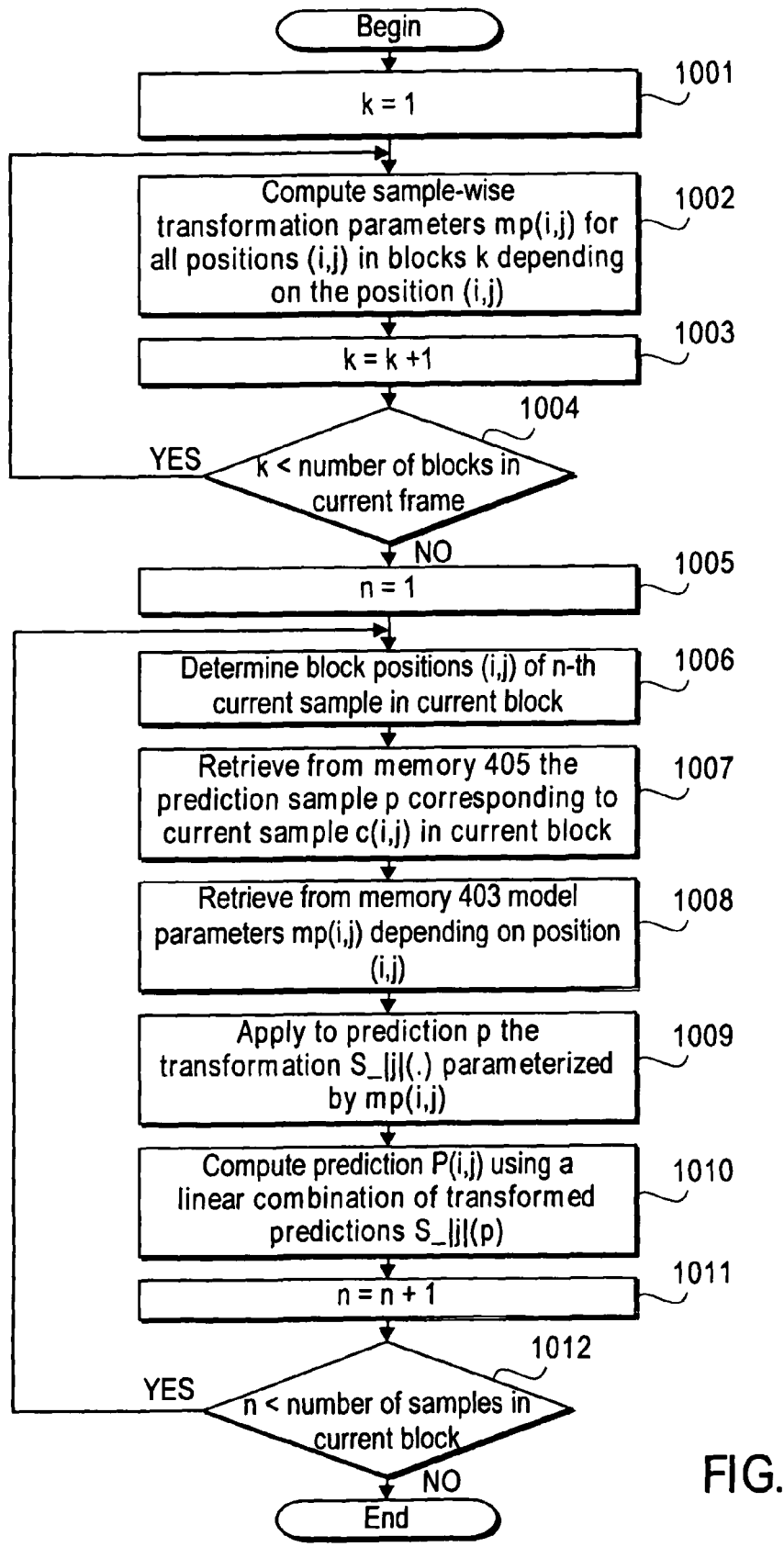
FIG. 10 is a flow diagram of one embodiment of a prediction module process-3.

The process in FIG. 10 is performed by processing logic that may comprise hardware (circuitry, dedicated logic, etc.), software (such as is run on a general purpose computer system or a dedicated machine), or a combination of both.

Referring to FIG. 10, the process begins by processing logic setting an index variable k equal to 1 (processing block 1001). Processing logic then computes sample-wise transformation parameters mp(i,j) for all positions (i,j) in block k (processing block 1002). Next, processing logic increments the variable k by 1 (processing block 1003) and tests whether the value of k is less than the number of blocks in the current frame (processing block 1004). If it is, processing logic transitions to processing block 1002 and the process is repeated until the sample-wise transformation parameters are computed for all the blocks. If not, the process transitions to processing block 1005 where the variable n is initialized to 1.

After initializing the variable n, processing logic determines the block position (ij) of the n-th current sample in the current block (processing block 1006). After determining the block position, processing logic retrieves the prediction samples p corresponding to the current sample c(i,j) in the current block from memory 405 (processing block 1007) and retrieves the model parameters mp(i,j) for the position (i,j) from memory 403 (processing block 1008). Using the data retrieved from these memories, processing logic applies the transformation $S^1_{i,j}(.)$ parameterized by mp(i,j) to each prediction p (processing block 1009) and computes the prediction P(i,j) using a linear combination of transforms predictions $S^1_{i,j}(p)$ (processing block 1010).

After computing the prediction, processing logic increments variable n by 1 (processing block 1011) and tests whether the value of n is less than the number of samples in the current block (processing block 1012). If is it, the process transitions to processing block 1006 and the process repeats for all the samples in the current block. If not, the process ends.

In an alternate embodiment, the transformations $S^k_{i,j}(.)$ are determined as described. However, the prediction P(i,j) for sample c(i,j) in the current block c is determined as follows:

$P(i,j)=S^0_{i,j}(p(1)).$

The process described above is illustrated by the flow diagram in FIG. 11.

Figure 11:
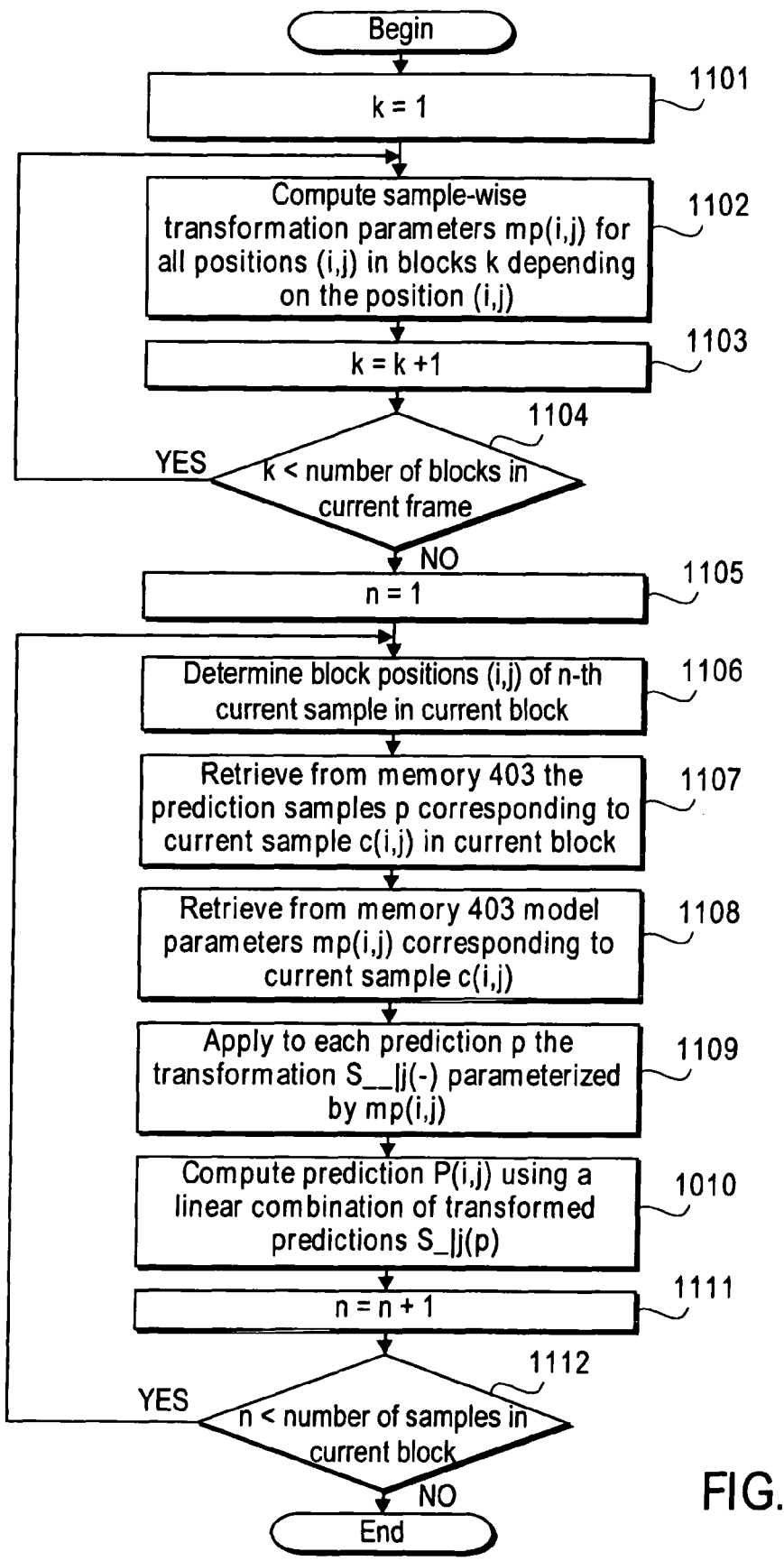
FIG. 11 is a flow diagram of one embodiment of a prediction module process-4.

The process in FIG. 11 is performed by processing logic that may comprise hardware (circuitry, dedicated logic, etc.), software (such as is run on a general purpose computer system or a dedicated machine), or a combination of both.

Referring to FIG. 11, the process begins by processing logic setting an index variable k equal to 1 (processing block 1101). Processing logic then computes sample-wise transformation parameters mp(i,j) for all positions (i,j) in block k (processing block 1102). Next, processing logic increments the variable k by 1 (processing block 1103) and tests whether the value of k is less than the number of blocks in the current frame (processing block 11104). If it is, the process transitions to processing block 1102 and the process is repeated until sample-wise transformation parameters are computed for all the blocks. If not, the process transitions to processing block 1105 where the variable n is initialized to 1.

After initializing the variable n, processing logic determines the block position (ij) of the n-th current sample in the current block (processing block 1106). After determining the block position, processing logic retrieves the prediction samples p corresponding to the current sample c(i,j) in the current block from memory 405 (processing block 1107) and retrieves the model parameters mp(ij) corresponding to the current sample c(i,j) from memory 403 (processing block 1108). Using the data retrieved from these memories, processing logic applies the transformation $S^1_{i,j}(.)$ parameterized by mp(i,j) to each prediction p (processing block 1109) and computes the prediction P(i,j) using a linear combination of transformed predictions $S^1_{i,j}(p)$ (processing block 1110).

After computing the prediction, processing logic increments variable n by 1 (processing block 1111) and tests whether the value of n is less than the number of samples in the current block (processing block 1112). If is it, the process transitions to processing block 1106 where the process is repeated for all the samples in the current block. If not, the process ends.

Figure 12:
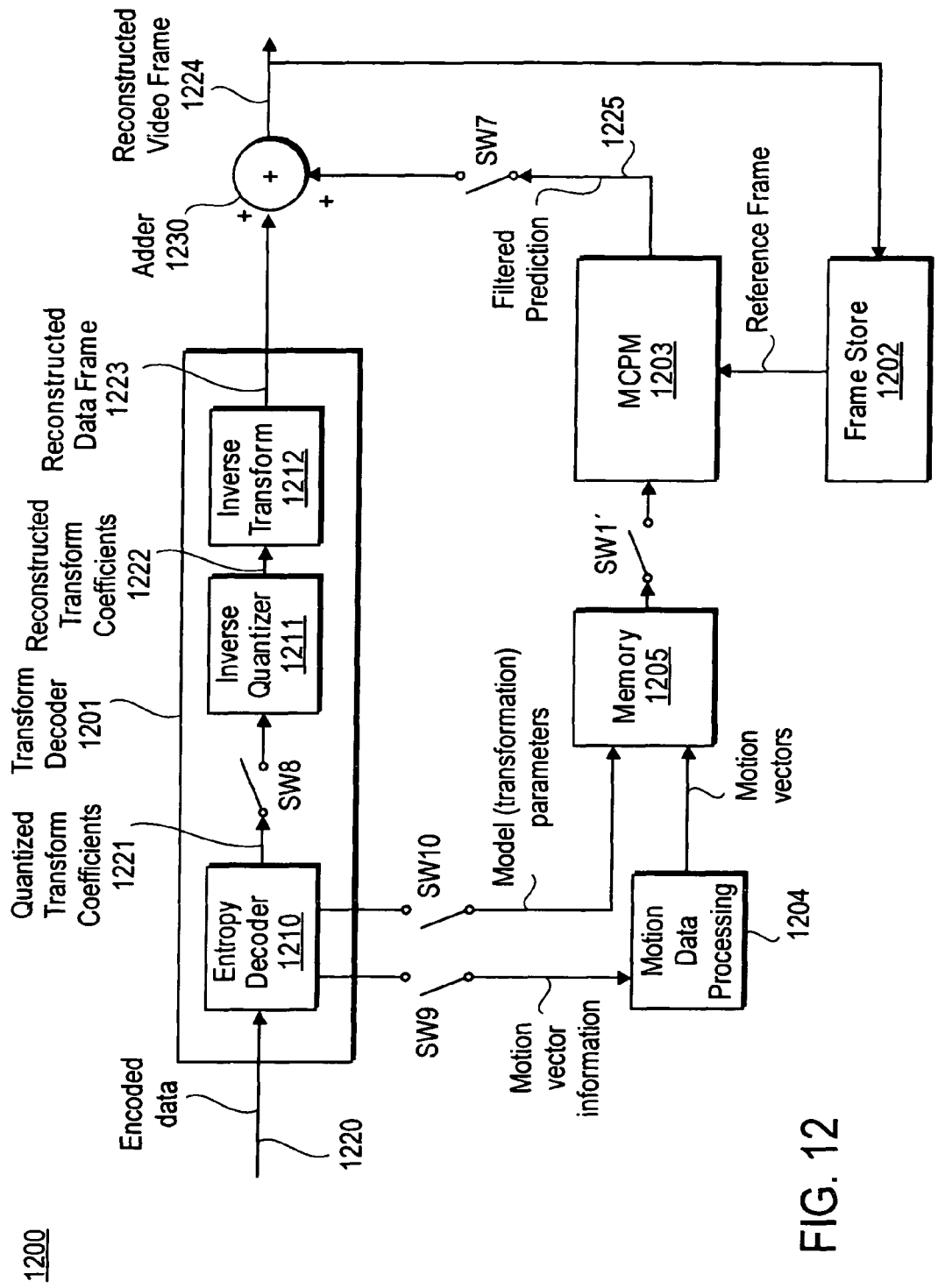
FIG. 12 is a block diagram of one embodiment of a video decoder.

FIG. 12 is a block diagram of one embodiment of a video decoder. Referring to FIG. 12, video decoder 1200 includes a transform decoder (TD) 1201, a frame store FS 1202 (memory), a motion compensation and prediction module (MCPM) 1203, a motion data processing module MDPM 1204, memory 1205 and switches SW7, SW8, SW9, SW10. Transform decoder 1201 includes an entropy decoder 1210, an inverse quantizer 1211, and an inverse transform module 1212. Transform decoder 1201 decodes all the blocks in the encoded frame data. More specifically, transform decoder 1201 receives encoded data and generates a reconstructed video frame according to a conventional intra-frame decoding process if the frame was encoded in INTRA mode by a video coder. If the current frame being decoded is not an INTRA frame, the video decoder reconstructs the video frame data according to the process specified below.

Entropy decoder 1210 receives and decodes encoded data 1220. The output of entropy decoder 1210 is quantized transform coefficients 1221. When SW8 is closed, quantized transform coefficients 1221 are quantized by inverse quantizer 1211 to produce reconstructed transform coefficients 1222. Inverse transform 1212 performs an inverse transform on reconstructed transform coefficients 1222 to produce reconstructed frame data 1223. Reconstructed frame data 1223 is output to combiner 1230, which combines reconstructed frame data 1223 with a filtered prediction 1225 from MCPM 1203 if SW7 is closed. The output of combiner 1230, and video decoder 1200, is reconstructed video frame 1224. Reconstructed video frame 1224 is also stored in frame store 1202.

MCPM 1203 produces filtered prediction 1225 based on one or more reference frames from frame store 1202 and data from memory 1205 when SW1 is closed. The data may include model (transformation) parameters provided to memory 1205 from entropy decoder 1210 when SW10 is closed and motion vectors from MDPM 1204. MDPM 1204 produces the motion vectors in response to motion vector information received from entropy decoder 1210 when SW9 is closed.

Figure 13:
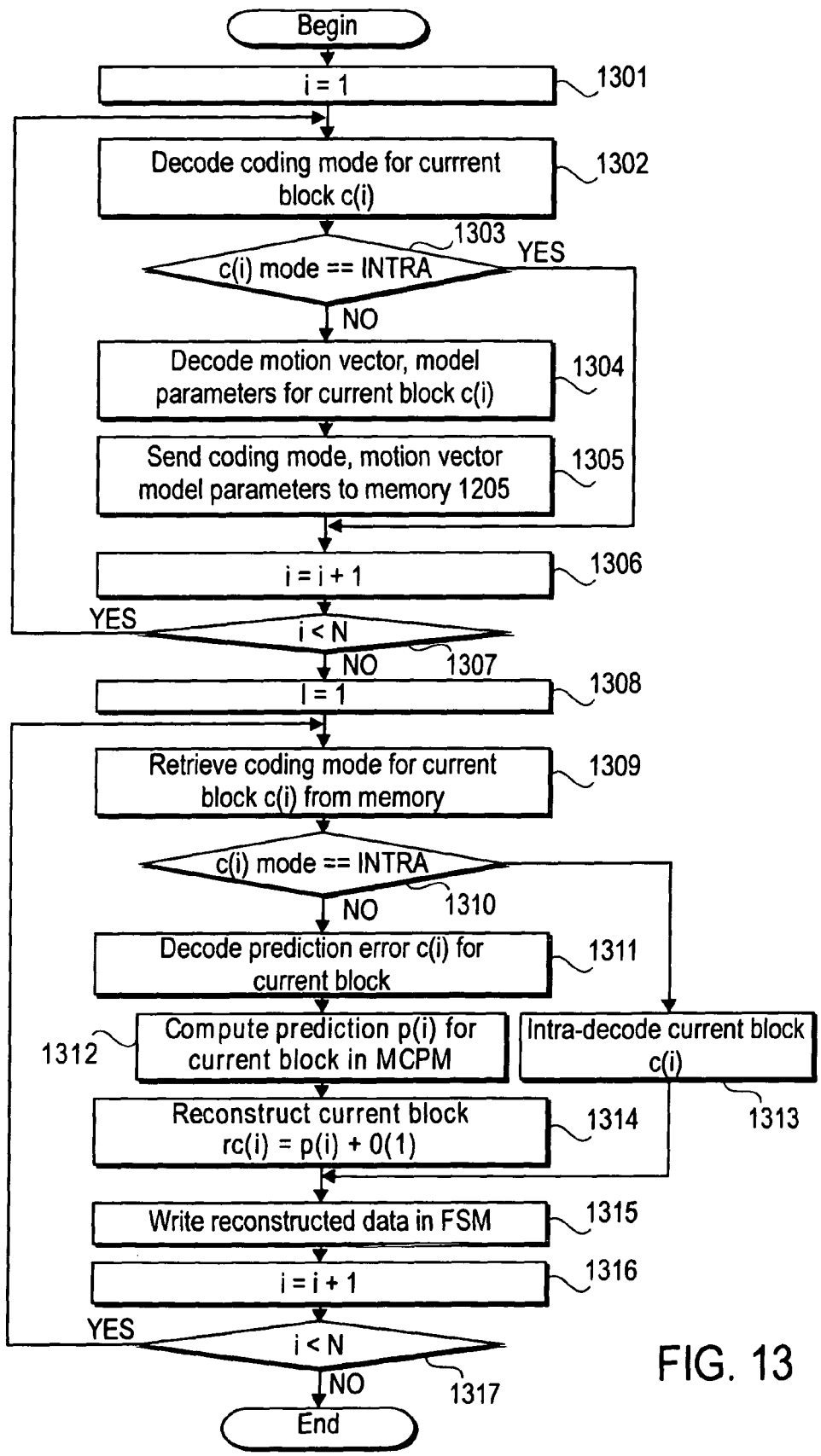
FIG. 13 is a flow diagram of one embodiment of a video decoding process for predicted frames.

FIG. 13 is a flow diagram of one embodiment of the video decoding process performed by the video decoder of FIG. 12. The VD process is illustrated for the case where the coded frame type is not INTRA. Initially, SW7, SW8, SW9 are open, SW10 is closed. The entropy decoder decodes the block coding mode of the current block in the video frame being decoded. If the block mode is INTRA the mode information is sent to memory 1205. The coding mode of the next block in the current frame is decoded. If the current block coding mode is not INTRA, SW7 is open, SW8 is open, SW9 is closed, SW10 is closed, SW11 is open. The entropy decoder 1210 decodes the motion vector and transformation parameter information corresponding to the current block, which it then sends to memory 1205 along with the coding mode of the current block. Then the next block in the current frame is processed. The process described above is repeated for all the blocks of the current frame being decoded. Next, a process is initiated which processes all the blocks in the current frame as follows. For this case, SW8 is closed, SW9 is open, SW10 is open, SW11 is closed, and SW7 is open if the current block's coding mode is INTRA, and is closed otherwise. If the coding mode for the current block in the frame is INTRA, the transform decoder decodes the INTRA block in a conventional manner and sends the reconstructed block data to the frame store 1202. If the coding mode for the current block being decoded is not INTRA, transform decoder 1201 decodes the prediction error block corresponding to the current block position in the current frame. Also, MCPM 1203 computes the prediction corresponding to the current block according to the MCPM process described in the video coder, by retrieving the block coding modes, motion vectors and transformation parameters stored in memory 1205. The reconstructed current block data is then obtained by adding the prediction error block decoded by transform decoder 1201 to the prediction generated by MCPM 1203. The reconstructed current block data is written in the frame store 1202. The process described above is repeated for all the blocks in the frame being decoded.

FIG. 13 is a flow diagram of one embodiment of a video decoding process for predicted frames. The process performed is performed by processing logic that may comprise hardware (circuitry, dedicated logic, etc.), software (such as is run on a general purpose computer system or a dedicated machine), or a combination of both.

Referring to FIG. 13, the process begins by processing logic initializing an index i equal to 1 (processing block 1301). Using the index i, processing logic decodes the coding mode for the current block c(i) (processing block 1302) and tests whether the coding mode is INTRA (processing block 1303). If it is, processing transitions directly to processing block 1306. If not, processing logic decodes the motion vector and model parameters for the current block c(i) (processing block 1304), sends the coding mode, motion vector and model parameters to memory 1205, and then proceeds to processing block 1306.

At processing block 1306, processing logic increments the index i by 1 and tests whether the index i is less than the total number of blocks (N) (processing block 1307). If it is, the process logic transitions the processing block 1302 where the process is repeated for the next block. If not, the processing logic transitions to processing block 1308 where the index i is initialized again to 1.

With the index i reinitialized to 1, processing logic retrieves the coding mode for the current blocks c(i) from memory 1205 (processing block 1309) and tests whether the coding mode is INTRA (processing block 1310). If it is, processing logic performs intra-decoding on the current block c(i) (processing block 1313) and then transitions to processing block 1315. If not, processing logic decodes the prediction error e(i) for the current block (processing block 1311), computes the prediction p(i) for the current block in MCPM 1203 (processing block 1312), reconstructs the current block according to the equation rc(i)=p(i)+e(i) (processing block 1314), and transitions to processing block 1315.

At processing block 1315, processing logic writes the reconstructed data into frame store 1202. Thereafter, processing logic increments the index i (processing block 1316) and tests whether the index i is less than the number of blocks (N) (processing block 1317). If it is, the process transitions to processing block 1309 and the process is repeated for the rest of the block. If not, the process ends.

The methods and apparatus of described herein are used to determine temporal prediction having superior performance compared to prior art solutions.

An Example of a Computer System

Figure 14:
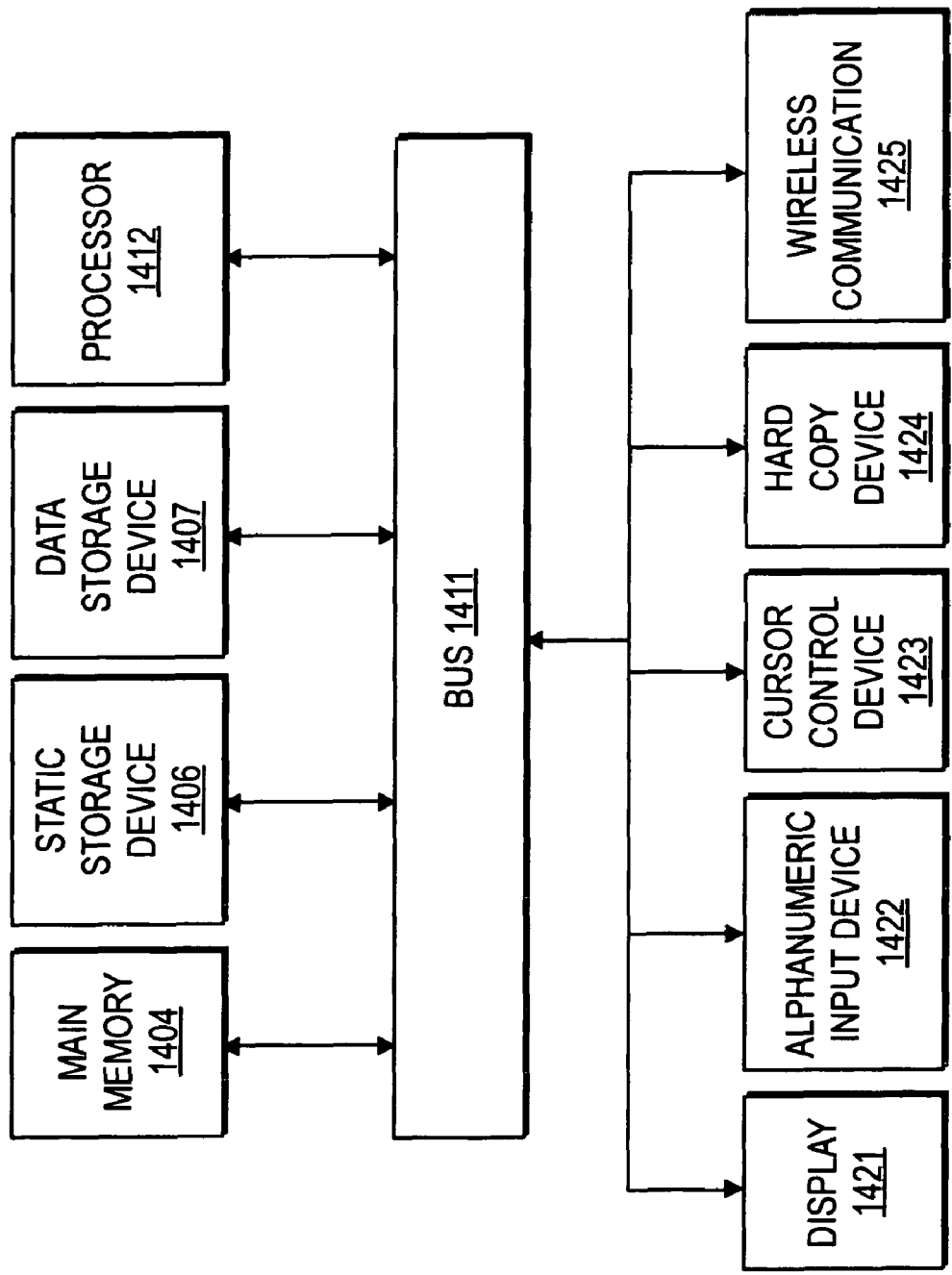
FIG. 14 is a block diagram of one embodiment of a computer system.

FIG. 14 is a block diagram of an exemplary computer system that may perform one or more of the operations described herein. Referring to FIG. 14, computer system 1400 may comprise an exemplary client or server computer system. Computer system 1400 comprises a communication mechanism or bus 1411 for communicating information, and a processor 1412 coupled with bus 1411 for processing information. Processor 1412 includes a microprocessor, but is not limited to a microprocessor, such as, for example, Pentium™, PowerPC™, etc.

System 1400 further comprises a random access memory (RAM), or other dynamic storage device 1404 (referred to as main memory) coupled to bus 1411 for storing information and instructions to be executed by processor 1412. Main memory 1404 also may be used for storing temporary variables or other intermediate information during execution of instructions by processor 1412.

Computer system 1400 also comprises a read only memory (ROM) and/or other static storage device 1406 coupled to bus 1411 for storing static information and instructions for processor 1412, and a data storage device 1407, such as a magnetic disk or optical disk and its corresponding disk drive. Data storage device 1407 is coupled to bus 1411 for storing information and instructions.

Computer system 1400 may further be coupled to a display device 1421, such as a cathode ray tube (CRT) or liquid crystal display (LCD), coupled to bus 1411 for displaying information to a computer user. An alphanumeric input device 1422, including alphanumeric and other keys, may also be coupled to bus 1411 for communicating information and command selections to processor 1412. An additional user input device is cursor control 1423, such as a mouse, trackball, trackpad, stylus, or cursor direction keys, coupled to bus 1411 for communicating direction information and command selections to processor 1412, and for controlling cursor movement on display 1421.

Another device that may be coupled to bus 1411 is hard copy device 1424, which may be used for marking information on a medium such as paper, film, or similar types of media. Another device that may be coupled to bus 1411 is a wired/wireless communication capability 1425 to communication to a phone or handheld palm device. Note that any or all of the components of system 1400 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A decoding method comprising:
    generating a prediction for a sample in one of a plurality of blocks in a frame using transformation parameters associated with the one block and transformation parameters associated with at least one other block in the plurality of blocks in the frame; and
    adding residual data to the prediction to obtain a decoded sample.

2. The method defined in claim 1 wherein the transformation parameters comprises intensity compensation information, and wherein generating the prediction is based on the intensity compensation information and motion information.

3. The method defined in claim 2 further comprising:
    conditionally selecting the motion information and the intensity compensation information; and
    filtering one or more of the motion information and intensity compensation information, and wherein generating the prediction is based on the filtered motion and intensity compensation information.

4. The method defined in claim 3 wherein filtering one or more of the motion and intensity compensation information comprises combining motion and intensity compensation parameters.

5. The method defined in claim 4 further comprising generating weights.

6. The method defined in claim 4 wherein filtering one or more of the motion information and intensity compensation information comprises filtering block intensity compensation parameters to obtain sample-level intensity compensation parameters.

7. The method defined in claim 1 further comprising filtering prediction samples.

8. The method defined in claim 7 wherein filtering prediction samples comprises linearly combining prediction samples.

9. The method defined in claim 7 wherein filtering prediction samples comprises compensating prediction samples using block intensity compensation parameters.

10. The method defined in claim 7 wherein filtering prediction samples comprises compensating prediction samples using sample level intensity compensation parameters.

11. The method defined in claim 2 wherein the motion information comprises motion vectors.

12. An apparatus comprising:
    a memory to store transformation parameters;
    a motion compensation and prediction module to generate a prediction for a sample in one of a plurality of blocks in a frame using the transformation parameters received from the memory and associated with the one block and transformation parameters received from the memory and associated with at least one other block in the plurality of blocks in the frame; and
    a combiner to add residual data to the prediction to obtain a decoded sample.

13. The apparatus defined in claim 12 wherein the transformation parameters comprises intensity compensation information, and wherein generating the prediction is based on the intensity compensation information and motion information.

14. The apparatus defined in claim 13 wherein the motion compensation and prediction module conditionally selects the motion information and the intensity compensation information and filters one or more of the motion information and intensity compensation information as part of generating the prediction.

15. The apparatus defined in claim 14 wherein the motion compensation and prediction module filters one or more of the motion and intensity compensation information by combining motion and intensity compensation parameters.

16. The apparatus defined in claim 14 wherein the motion compensation and prediction module generates weights.

17. The apparatus defined in claim 14 wherein the motion compensation and prediction module filters block intensity compensation parameters to obtain sample-level intensity compensation parameters.

18. The apparatus defined in claim 12 wherein the motion compensation and prediction module filters prediction samples.

19. The apparatus defined in claim 18 wherein the motion compensation and prediction module filters prediction samples by linearly combining prediction samples.

20. The apparatus defined in claim 18 wherein the motion compensation and prediction module filters prediction samples by compensating prediction samples using block intensity compensation parameters.

21. The apparatus defined in claim 18 wherein the motion compensation and prediction module filters prediction samples by compensating prediction samples using sample level intensity compensation parameters.

22. The apparatus defined in claim 18 wherein the motion compensation and prediction module filters a plurality of predictive samples, where each of the plurality of predictive samples is compensated using block intensity compensation parameters.

23. The apparatus defined in claim 12 wherein the motion compensation and prediction module filters block intensity compensation parameters to obtain sample-level intensity compensation parameters.

24. The apparatus defined in claim 12 wherein the motion compensation and prediction module filters a plurality of predictive samples, where each of the plurality of predictive samples is compensated using sample-level intensity compensation parameters.

25. The apparatus defined in claim 12 wherein the motion information comprises motion vectors.

26. An article of manufacture having non-transitory computer-readable storage medium storing instructions which, when executed by a system, cause the system to perform a method comprising:
  generating a prediction for a sample in one of a plurality of blocks in a frame using transformation parameters associated with the one block and transformation parameters associated with at least one other block in the plurality of blocks in the frame; and
  adding residual data to the prediction to obtain a decoded sample.

27. A method for encoding data comprising:
  generating a motion-compensated prediction for data in a block in a frame based on motion information and non-motion related transformation model information associated with a plurality of blocks in the frame;
  generating a prediction error based on the motion-compensated prediction; and
  coding the prediction error.

28. The method defined in claim 27 wherein the motion and non-motion related transformation model information comprises intensity-compensating parameters associated with the plurality of blocks in the frame and a set of temporal predictive samples.

29. The method defined in claim 27 wherein the motion-compensated prediction based on samples from a plurality of blocks of data in the reference frame.

30. The method defined in claim 27 further comprising:
  filtering the plurality of prediction samples; and
  combining filtered prediction samples to form the motion-compensated prediction for a current block of the frame.

31. The method defined in claim 27 wherein the prediction error comprises a difference between the current block of the frame and the final prediction.

32. An apparatus for encoding data in a frame, the apparatus comprising:
  a motion-compensated prediction module to generate a motion-compensated prediction for a block in the frame, the motion-compensated prediction module comprising
    a selective motion compensation block to generate motion-compensation data in response to reference frame data and selected motion vectors and transformation parameters, and
    a prediction module to generate the motion-compensated prediction based on motion and non-motion related transformation model information linking a plurality of blocks in the frame to corresponding reference blocks in one or more reference frames based on predictive samples from more than one block in the frame;
  a prediction error calculation module to generate a prediction error based on the motion-compensated prediction; and
  a coder module to code the prediction error.

33. The apparatus defined in claim 32 wherein the motion and non-motion related transformation model information comprises intensity-compensating parameters associated with a plurality of blocks in the frame and a set of temporal predictive samples.

34. The apparatus defined in claim 32 wherein the prediction module generates a motion-compensated prediction based on samples from a plurality of blocks of data in the reference frame.

35. The apparatus defined in claim 32 wherein selective motion compensation filters the plurality of prediction samples in the motion-compensated prediction; and the prediction module combines filtered prediction samples to form the motion-compensated prediction for a current block of the frame.

36. The apparatus defined in claim 32 wherein the prediction error comprises a difference between the current block of the frame and the final prediction.

37. An article of manufacture having non-transitory computer-readable storage medium storing instructions which, when executed by a system, cause the system to perform a method comprising:
  generating a motion-compensated prediction for data in a block in a frame based on motion information and non-motion related transformation model information associated with a plurality of blocks in the frame;
  generating a prediction error based on the motion-compensated prediction; and
  coding the prediction error.

* * * * *